United States Patent
Ito et al.

(10) Patent No.: US 9,973,616 B2
(45) Date of Patent: May 15, 2018

(54) IMAGING SYSTEM, IMAGING DEVICE, INFORMATION PROCESSING DEVICE, METHOD, AND PROGRAM

(71) Applicant: Sony Corporation, Tokyo (JP)

(72) Inventors: Ryogo Ito, Tokyo (JP); Yoko Fukata, Tokyo (JP); Keiji Okamoto, Chiba (JP); Kazuma Akamatsu, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days. days.

(21) Appl. No.: 15/306,391

(22) PCT Filed: May 1, 2015

(86) PCT No.: PCT/JP2015/063124
§ 371 (c)(1),
(2) Date: Oct. 24, 2016

(87) PCT Pub. No.: WO2015/194274
PCT Pub. Date: Dec. 23, 2015

(65) Prior Publication Data
US 2017/0048380 A1    Feb. 16, 2017

(30) Foreign Application Priority Data
Jun. 17, 2014    (JP) ................................. 2014-124487

(51) Int. Cl.
*H04B 5/00*         (2006.01)
*H04M 1/725*        (2006.01)
(Continued)

(52) U.S. Cl.
CPC ... *H04M 1/72569* (2013.01); *H04M 1/72533* (2013.01); *H04N 5/2257* (2013.01);
(Continued)

(58) Field of Classification Search
CPC ..................... H04M 1/72569; H04M 1/72533
(Continued)

(56) References Cited

U.S. PATENT DOCUMENTS 6,148,141 A * 11/2000 Maeda ..................... H04N 5/77
                                                   348/231.99
7,042,499 B1 * 5/2006 Kido .................. H04N 1/00204
                                                   348/208.16
(Continued)

FOREIGN PATENT DOCUMENTS

DE    199 10 648 A1    9/2000
EP    1 455 505 A1     9/2004
(Continued)

OTHER PUBLICATIONS

Extended European Search Report dated Jan. 19, 2018 for corresponding European Application No. 15809952.3.

*Primary Examiner* — Md Talukder
(74) *Attorney, Agent, or Firm* — Michael Best & Friedrich LLP

(57) ABSTRACT

An imaging system includes a control unit. Also, an imaging device and an information processing device with a cellular phone function include a fixed state in which the devices are fixed to each other, and a separated state in which the devices are separated from each other. Fixation/separation information indicates the fixed state or the separated state. The control unit performs, for the imaging device or the information processing device, different state controls in accordance with the fixation/separation information and an operation state of the cellular phone function. For example, user-friendliness of both the cellular phone function of the information processing device and an imaging function of the imaging device improves by performing different state controls at the time of reception of an incoming call, an (Continued)

incoming call responding state, and an incoming call response end in accordance with the fixed state or the separated state.

19 Claims, 19 Drawing Sheets

(51) Int. Cl.
    *H04N 5/232*     (2006.01)
    *H04N 5/225*     (2006.01)
    *H04M 1/60*     (2006.01)
    *H04M 1/02*     (2006.01)

(52) U.S. Cl.
    CPC ..... *H04N 5/23209* (2013.01); *H04N 5/23245* (2013.01); *H04M 1/0254* (2013.01); *H04M 1/6041* (2013.01); *H04M 1/7253* (2013.01); *H04M 2250/52* (2013.01)

(58) Field of Classification Search
    USPC ........................ 455/41.1, 41.2, 41.3
    See application file for complete search history.

(56) References Cited

U.S. PATENT DOCUMENTS

| | | | | |
|---|---|---|---|---|
| 7,957,765 | B1* | 6/2011 | Causey | H04M 1/0256 |
| | | | | 455/550.1 |
| 8,704,929 | B2* | 4/2014 | Imai | H04N 5/23222 |
| | | | | 348/207.99 |
| 2002/0058536 | A1* | 5/2002 | Horii | H04M 1/0256 |
| | | | | 455/566 |
| 2005/0248683 | A1* | 11/2005 | Ariga | H04N 5/2251 |
| | | | | 348/370 |
| 2008/0119223 | A1* | 5/2008 | Tsunoda | H04M 1/72522 |
| | | | | 455/556.1 |
| 2008/0212041 | A1* | 9/2008 | Koizumi | G03B 29/00 |
| | | | | 353/122 |
| 2009/0124281 | A1* | 5/2009 | Takamune | H04M 1/6066 |
| | | | | 455/550.1 |
| 2012/0044373 | A1* | 2/2012 | Shiozaki | G03B 35/08 |
| | | | | 348/218.1 |
| 2014/0132781 | A1* | 5/2014 | Adams | H04N 5/2254 |
| | | | | 348/207.1 |
| 2014/0160304 | A1* | 6/2014 | Galor | H04N 5/232 |
| | | | | 348/207.1 |
| 2015/0130984 | A1* | 5/2015 | Lim | H04N 5/232 |
| | | | | 348/335 |
| 2015/0201131 | A1* | 7/2015 | Ohshima | H04N 5/23293 |
| | | | | 348/333.07 |
| 2016/0269514 | A1* | 9/2016 | Ito | H04M 1/0256 |
| 2016/0269635 | A1* | 9/2016 | Ito | H04N 5/23209 |
| 2016/0295090 | A1* | 10/2016 | Ito | G03B 17/02 |
| 2016/0309088 | A1* | 10/2016 | Ito | H04N 5/772 |
| 2016/0337586 | A1* | 11/2016 | Watanabe | H04N 5/23241 |
| 2017/0031235 | A1* | 2/2017 | Kubotera | G03B 17/04 |
| 2017/0048380 | A1* | 2/2017 | Ito | H04M 1/72533 |

FOREIGN PATENT DOCUMENTS

| | | |
|---|---|---|
| JP | 06-205274 A | 7/1994 |
| JP | 2002-152696 A | 5/2002 |
| JP | 2012-186698 A | 9/2012 |

* cited by examiner

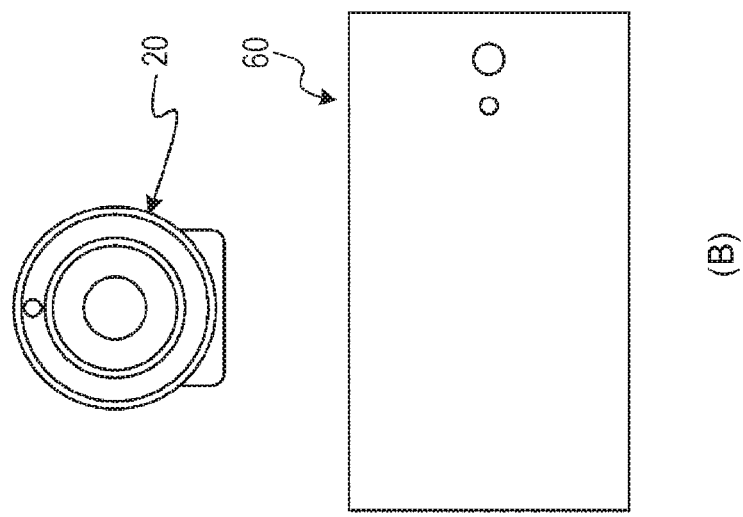
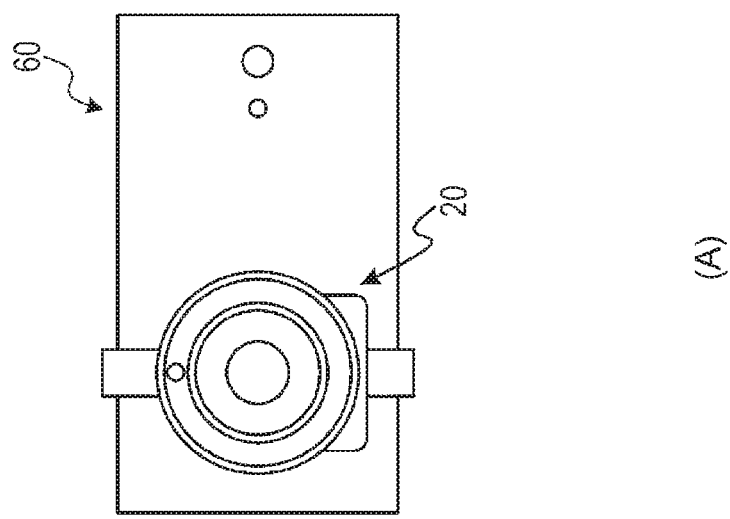
FIG. 8

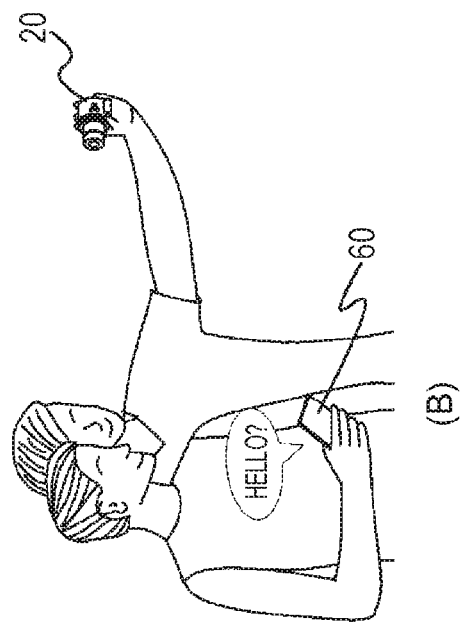

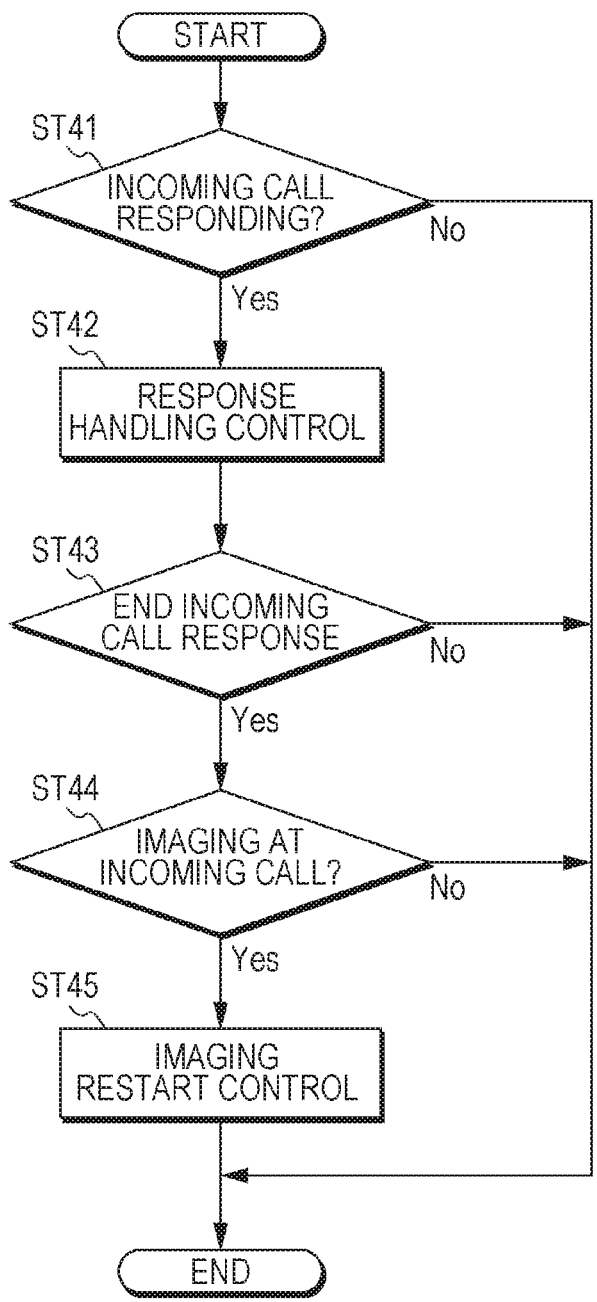

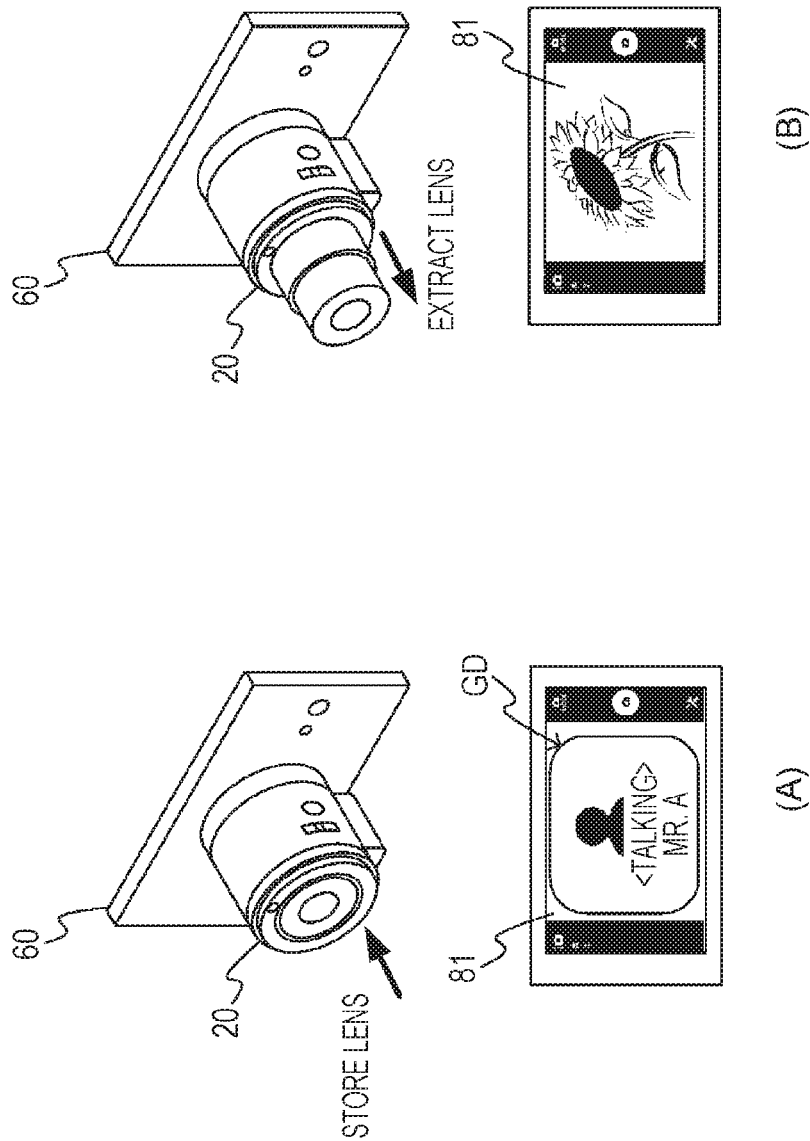

FIG. 19

| | | | FIXED STATE (IN TARGET OPERATION MODE) | | SEPARATED STATE (IN TARGET OPERATION MODE) | | | NOT LINKED | |
|---|---|---|---|---|---|---|---|---|---|
| | | | STATE CONTROL | TARGET OPERATION MODE | STATE CONTROL | TARGET OPERATION MODE | STATE CONTROL | | |
| INCOMING CALL RECEPTION | INFORMATION PROCESSING DEVICE | IMAGE | DISPLAY SMALL ICON | STILL IMAGE, DYNAMIC IMAGE | DISPLAY SMALL ICON | STILL IMAGE, DYNAMIC IMAGE | DISPLAY NORMAL ICON | | |
| | | VOICE ETC. | OUTPUT NEITHER RINGTONE NOR VIBRATION | STILL IMAGE (CONTINUOUS CAPTURING (VIBRATION EFFECT PREVENTED) AND VOICE RECORDING), DYNAMIC IMAGE | OUTPUT BOTH RINGTONE AND VIBRATION | STILL IMAGE, DYNAMIC IMAGE | OUTPUT BOTH RINGTONE AND VIBRATION | | |
| | IMAGING DEVICE | | NOTHING IN PARTICULAR | — | DISPLAY INCOMING CALL (BLINKING DISPLAY ETC.) | STILL IMAGE, DYNAMIC IMAGE | * * * | | |
| INCOMING CALL RESPONSE (START, | INFORMATION PROCESSING DEVICE | | TELEPHONE CALL START IN NORMAL CALL MODE BY SHIFT TO SEPARATED STATE DISPLAY MAIL CONTENTS BY SHIFT TO SEPARATED STATE | STILL IMAGE, DYNAMIC IMAGE | START TELEPHONE CALL IN SPEAKER PHONE MODE BY TELEPHONE CALL START OPERATION START FUNCTION BY MAIL FUNCTION SELECTION OPERATION | STILL IMAGE, DYNAMIC IMAGE | TELEPHONE CALL START IN NORMAL CALL MODE BY TELEPHONE CALL START OPERATION START FUNCTION BY MAIL FUNCTION SELECTION OPERATION | | |
| | IMAGING DEVICE | | RETRACT LENS BY SHIFT TO SEPARATED STATE | STILL IMAGE, DYNAMIC IMAGE (NOT DURING RECORDING STATE, RECORDING INTERRUPTION STATE) | DISPLAY INCOMING CALL RESPONSE START (LIGHTING DISPLAY ETC.) | STILL IMAGE, DYNAMIC IMAGE | * * * | | |
| (RESPONDING) | INFORMATION PROCESSING DEVICE | IMAGE | DISPLAY TELEPHONE CALL, MAIL RELATED-MATTER | STILL IMAGE, DYNAMIC IMAGE | DISPLAY TELEPHONE CALL, MAIL RELATED-MATTER | STILL IMAGE, DYNAMIC IMAGE | DISPLAY TELEPHONE CALL, MAIL RELATED-MATTER | | |
| | | VOICE ETC. | INPUT/OUTPUT VOICE OF TELEPHONE CALL MAIL RELATED-MATTER | STILL IMAGE, DYNAMIC IMAGE | INPUT/OUTPUT VOICE OF TELEPHONE CALL MAIL RELATED-MATTER | STILL IMAGE, DYNAMIC IMAGE | INPUT/OUTPUT VOICE OF TELEPHONE CALL MAIL RELATED-MATTER | | |
| | IMAGING DEVICE | | POWER OFF, STANDBY, SWITCH TO POWER SAVING MODE | STILL IMAGE AND DYNAMIC IMAGE | DISPLAY INCOMING CALL RESPONDING STATE (LIGHTING DISPLAY ETC.) | STILL IMAGE, DYNAMIC IMAGE | * * * | | |
| (RESPONSE END) | INFORMATION PROCESSING DEVICE | | END TELEPHONE CALL BY SHIFT TO ORIGINAL STATE END MAIL FUNCTION BY SHIFT TO ORIGINAL STATE | STILL IMAGE, DYNAMIC IMAGE | END TELEPHONE CALL BY TELEPHONE CALL END OPERATION END FUNCTION BY MAIL FUNCTION OPERATION | STILL IMAGE, DYNAMIC IMAGE | END TELEPHONE CALL BY TELEPHONE CALL END OPERATION END FUNCTION BY MAIL FUNCTION OPERATION | | |
| | IMAGING DEVICE | | EXTRACT LENS BY SHIFT TO CONNECTION STATE | STILL IMAGE, DYNAMIC IMAGE | END RESPONSE DISPLAY (LIGHT-OFF DISPLAY, ETC.) | STILL IMAGE, DYNAMIC IMAGE | * * * | | |
| ALARM NOTIFICATION | INFORMATION PROCESSING DEVICE | IMAGE | DISPLAY SMALL ICON | STILL IMAGE, DYNAMIC IMAGE | DISPLAY SMALL ICON | STILL IMAGE, DYNAMIC IMAGE | DISPLAY NORMAL ICON | | |
| | | VOICE ETC. | OUTPUT NEITHER ALARM SOUND NOR RINGTONE | STILL IMAGE (RECORDING WITH VOICE), DYNAMIC IMAGE | OUTPUT BOTH ALARM SOUND AND RINGTONE | STILL IMAGE, DYNAMIC IMAGE | OUTPUT BOTH ALARM SOUND AND RINGTONE | | |
| | IMAGING DEVICE | | NOTHING IN PARTICULAR | — | DISPLAY ALARM IDENTIFICATION | STILL IMAGE, DYNAMIC IMAGE | * * * | | |

* * * SHOWS NOT APPLICABLE ITEM

IMAGING SYSTEM, IMAGING DEVICE, INFORMATION PROCESSING DEVICE, METHOD, AND PROGRAM

TECHNICAL FIELD

The present technology relates to an imaging system, an imaging device, an information processing device, a method, and a program, developed to improve user-friendliness of both a cellular phone function of the information processing device, and an imaging function of the imaging device.

BACKGROUND ART

It has become widespread to use an imaging device, such as a digital still camera and a digital video camera, which generates image data by imaging a subject, and records the generated image data as content. In addition, with a spread of an information processing device having a cellular phone function and other functions (such as smartphone), it has been proposed to operate an imaging device by wireless remote control from a far position by using an information processing device (for example, see Patent Document 1).

CITATION LIST

Patent Document

Patent Document 1: Japanese Patent Publication Laid-Open No. 2012-186698

SUMMARY OF THE INVENTION

Problems to be Solved by the Invention

Incidentally, the imaging device is not necessarily located away from the information processing device, but may be fixed to the information processing device. It is further probable that the information processing device has a cellular phone function.

Accordingly, an object of this technology is to provide an imaging system, an imaging device, an information processing device, a method, and a program, capable of improving user-friendliness of both a cellular phone function of the information processing device and an imaging function of the imaging device, even in case of the imaging device and the information processing device configured for use in a state of being fixed to each other as well as in a state of being separated from each other.

Solutions to Problem

A first aspect of this technology is directed to an imaging system including a control unit that performs, for an imaging device or an information processing device including a cellular phone function, different state controls in accordance with fixation/separation information indicating a fixed state in which the imaging device and the information processing device are fixed to each other, or a separated state in which the imaging device and the information processing device are separated from each other, and in accordance with an operation state of the cellular phone function.

The imaging system of this technology includes the fixed state in which the imaging device and the information processing device including the cellular phone function are fixed to each other, and the separated state in which the imaging device and the information processing device are separated from each other. The fixed state or the separated state is determined by a fixation/separation determination unit, for example. The control unit performs, for the imaging device or the information processing device, different state controls in accordance with selection of the fixed state or the separated state during use of the cellular phone function in the linked state of the imaging device and the information processing device, for example. More specifically, an incoming call notification method is switched in accordance with selection of the fixed state or the separated state when an incoming call is received in the cellular phone function. According to the notification method used by the control unit in the fixed state, incoming call notification is not contained in information recorded by the imaging device. In the separated state, however, reception of an incoming call in the information processing device is presented by the imaging device. The control unit further determines, in the fixed state, an instruction of a start of a response to an incoming call based on a state shift from the fixed state to the separated state during reception of an incoming call in the cellular phone function, and determines an instruction of an end of a response to an incoming call based on a state shift from the separated state to the fixed state during an incoming call responding state in the cellular phone function. When the imaging device is in the imaging mode in the fixed state at the time of a start of a response to an incoming call, the control unit ends the imaging mode. The control unit also restarts the imaging mode on the basis of a state shift from the separated state to the fixed state. In addition, the control unit in the separated state sets a speaker phone mode at the time of reception of an incoming call in the cellular phone function. The control unit in the separated mode further allows the imaging device to present that the information processing device is in an incoming call responding state in the cellular phone function.

A second aspect of this technology is directed to a control method including a step of performing, for an imaging device or an information processing device including a cellular phone function, different state controls in accordance with fixation/separation information indicating a fixed state in which the imaging device and the information processing device are fixed to each other, or a separated state in which the imaging device and the information processing device are separated from each other, and in accordance with an operation state of the cellular phone function.

A third aspect of this technology is directed to a program for causing a computer to execute a control for an information processing device or for an imaging device including a fixed state in which the imaging device and the information processing device including a cellular phone function are fixed to each other, and a separated state in which the imaging device and the information processing device are separated from each other. The program causes the computer to execute procedures performing, for the imaging device or the information processing device during use of the cellular phone function, different state controls in accordance with fixation/separation information indicating the fixed state or the separated state, and in accordance with an operation state of the cellular phone function.

Note that the program according to the present technology is a program allowed to be presented to a general-purpose computer capable of executing various program codes in computer-readable forms of storage media or communication media, such as storage media including an optical disk, a magnetic disk, and a semiconductor memory, and communication media including a network. Processes corresponding to the program are realized by a computer under the program presented to the computer in the computer-readable forms.

A fourth aspect of this technology is directed to an imaging device that includes a fixed state of being fixed to an information processing device including a cellular phone function, and a separated state of being separated from the information processing device, the imaging device including a control unit that performs different state controls in accordance with fixation/separation information indicating the fixed state or the separated state, and in accordance with an operation state of the cellular phone function during use of the cellular phone function of the information processing device.

A fifth aspect of this technology is directed to an information processing device that includes a fixed state of being fixed to an imaging device, and a separated state of being separated from the imaging device, the information processing device including: a cellular phone function unit; and a control unit that executes, for the imaging device, different state controls in accordance with fixation/separation information indicating the fixed state or the separated state, and in accordance with an operation state of the cellular phone function during use of the cellular phone function unit.

Effects of the Invention

According to this technology, a control unit performs, for an imaging device or an information processing device including a cellular phone function, different state controls in accordance with fixation/separation information indicating a fixed state in which the imaging device and the information processing device are fixed to each other, or a separated state in which the imaging device and the information processing device are separated from each other, and in accordance with an operation state of the cellular phone function. Accordingly, user friendliness of both the cellular phone function of the information processing device and an imaging function of the imaging device improves. Note that advantageous effects described in this specification are presented only by way of example, wherefore other advantageous effects or additional advantageous effects may be offered.

BRIEF DESCRIPTION OF DRAWINGS

FIG. 8 is a view illustrating a fixed state and a separated state of the imaging device and the information processing device, respectively.

FIG. 16 is a view illustrating an example of another operation for an incoming call response.

FIG. 17 is a flowchart showing a state control operation performed from an incoming call response start to an incoming call end.

FIG. 18 is a view illustrating an example of an operation for an incoming call end.

FIG. 19 is a view showing a list of state control operations presented as examples.

MODE FOR CARRYING OUT THE INVENTION

A mode for carrying out the present technology is hereinafter described. Note that the description is presented in the following order.

1. Function configuration of imaging system
2. External appearance of imaging system
3. Function configuration of imaging device
4. Function configuration of information processing device
5. Operations of imaging system
5-1. Link between imaging device and information processing device
5-2. Determination of fixed/separated state of imaging device and information processing device
5-3. State control operation of imaging system
5-3-1. State control operation for incoming call
5-3-2. State control operation for incoming call response
5-3-3. State control operation from incoming call response start to incoming call end
5-3-4. Other state control operations <1. Function Configuration of Imaging System>

Figure 1:
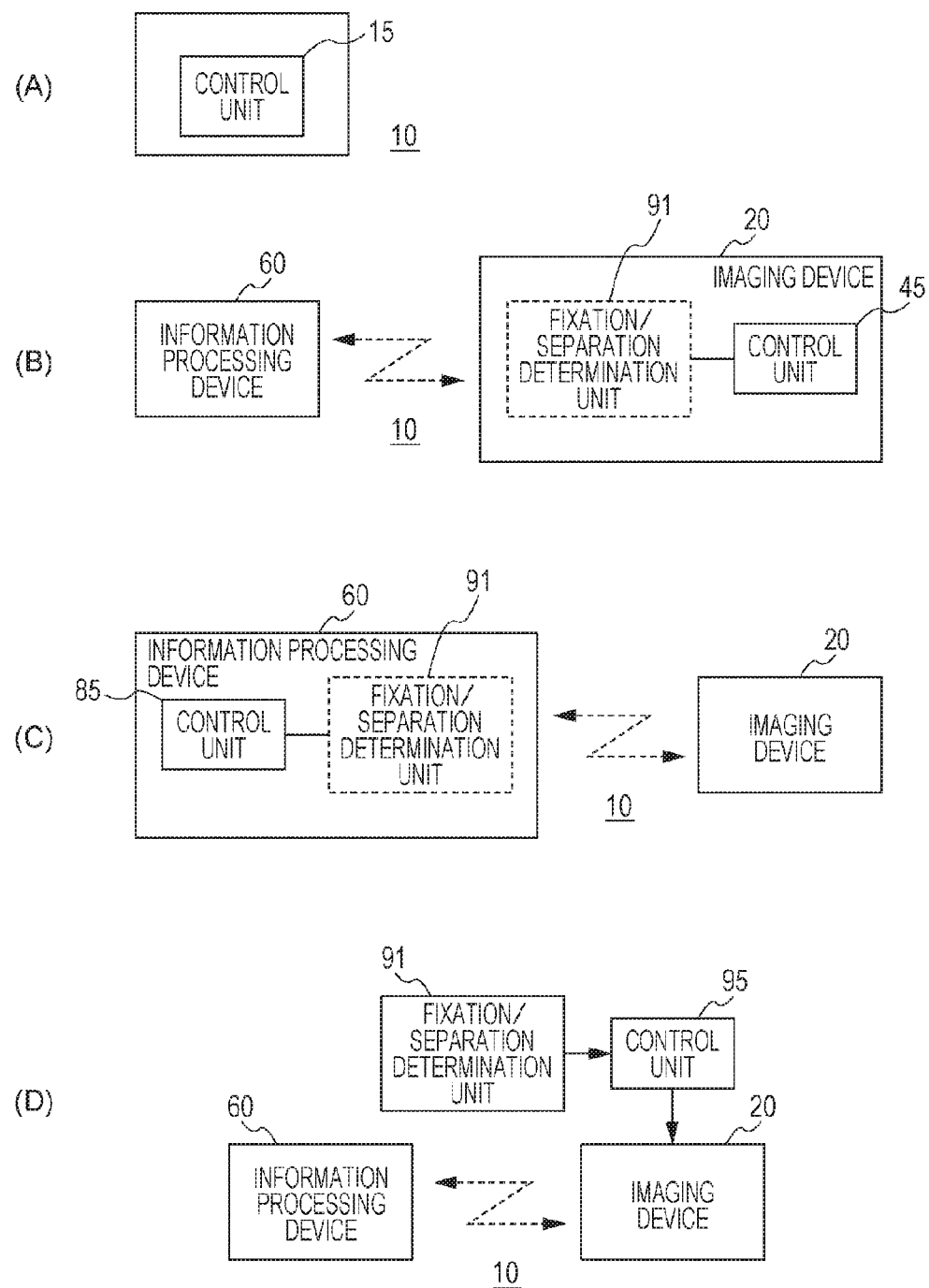
FIG. 1 is a view illustrating an example of a function configuration of an imaging system.

FIG. 1 illustrates an example of a function configuration of an imaging system 10 according to the present technology. The imaging system 10 has use modes for both a fixed state in which an imaging device and an information processing device including a cellular phone function are fixed to each other, and a separated state in which the imaging device and the information processing device are separated from each other. As illustrated in (A) of FIG. 1, the imaging system 10 includes a control unit 15. The control unit 15 performs, for the imaging device or the information processing device, different state controls in accordance with fixation/separation information indicating the fixed state in which the imaging device and the information processing device including the cellular phone function are fixed to each other, or the separated state in which the imaging device and the information processing device are separated from each other, and in accordance with an operation state of the cellular phone function. The control unit 15 is capable of improving user-friendliness of both the cellular phone function of the information processing device, and an imaging function of the imaging device by performing these state controls.

According to the imaging system 10, the control unit may be provided either on the imaging device, or on the information processing device. Alternatively, the control unit may be provided on an adaptor fixing the imaging device and the information processing device. For example, the imaging system 10 illustrated (B) of in FIG. 1 by way of example includes a control unit 45 provided on the imaging device 20 for operation control, and having a function of performing different state controls in accordance with the fixation/separation information and the operation state of the cellular phone function. Moreover, the imaging system 10 illustrated in (C) of FIG. 1 by way of example includes a control unit 85 provided on the information processing device 60 for operation control, and having a function of performing different state controls in accordance with the fixation/separation information and the operation state of the cellular phone function. Furthermore, the imaging system 10 illustrated in (D) of FIG. 1 by way of example includes a control unit 95 provided independently from the imaging device 20 and the information processing device 60, and having a function of performing different state controls in accordance with the fixation/separation information and the operation state of the cellular phone function.

A fixation/separation determination unit, which determines whether the imaging device and the information processing device having the cellular phone function are in the fixed state in which the devices are fixed to each other, or in the separated state in which the devices are separated from each other, may be provided on the imaging device 20 as illustrated in (B) of FIG. 1, or may be provided on the information processing device 60 as illustrated in (C) of FIG. 1, for example. Alternatively, a fixation/separation determination unit 91 may be provided independently from the imaging device 20 and the information processing device 60 as illustrated in (D) of FIG. 1. For example, the fixation/separation determination unit 91 may be provided on an adaptor or the like fixing the imaging device and the information processing device. The fixation/separation determination unit generates fixation/separation determination information indicating a determination result, and outputs the generated fixation/separation determination information to the control unit. The control unit performs different state controls for the fixed state and the separated state on the basis of the fixation/separation determination information. Alternatively, the fixation/separation determination unit 91 may be provided on the device different from the device including the control unit for performing, for the imaging device or the information processing device, different state controls in accordance with the fixation/separation information and the operation state of the cellular phone function. For example, as in the case of the imaging system 10 illustrated in (TB) of FIG. 1, the fixation/separation determination unit 91 may be provided on the information processing device 60 when the control unit 45 of the imaging device 20 has the function for performing different state controls in accordance with the fixation/separation information and the operation state of the cellular phone function.

The imaging device 20 forms captured images (still images and dynamic images). The imaging device 20 further has a wireless communication function for communication of various information with the information processing device 60. In addition, the imaging device 20 does not have a function for displaying captured images formed by imaging, or a function for outputting voices during imaging. Captured images and voices are displayed and output by the information processing device to which image data and audio data during imaging are transmitted. Note that the imaging device 20 may have a function for displaying captured images or a function for outputting voices during imaging.

The information processing device 60 is a device having a wireless communication function, a cellular phone function, and a display function. For example, the information processing device may be constituted by a cellular phone or a smartphone. The wireless communication function in this context is a near field communication (NFC) function, a Wi-Fi communication function in conformity to communication standards of IEEE 802.11 series, a long term evolution (LTE) function, or other communication functions. In addition, the cellular phone function in this context is a function for transmitting telephone calls and various types of information (such as mails, image information, and audio information) by communicating with base stations. The information processing device 60 processes information supplied from the imaging device 20 by utilizing the wireless communication function. For example, the information processing device 60 displays captured images and outputs voices on the basis of image data and audio data supplied from the imaging device 20.

Note that the configuration of the imaging system 10 is not limited to the configuration illustrated in FIG. 1. For example, the imaging system 10 may be constituted by the control unit 15 only, the control unit 45 only, the imaging device 20 only, the information processing device 60 only, or a combination of these units and devices.

<2. External Appearance of Imaging System>

Figure 2:
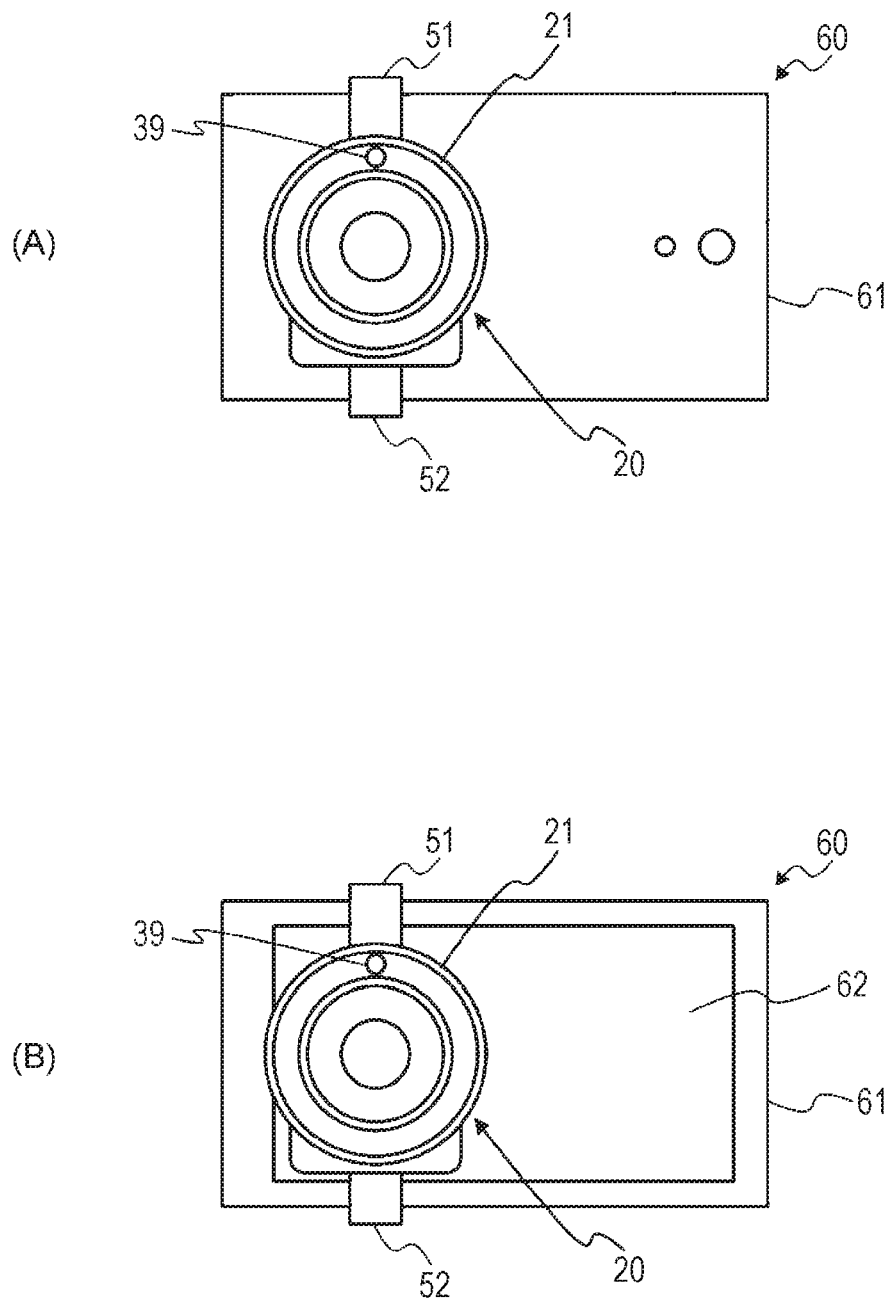
FIG. 2 is a view illustrating an example of an external appearance configuration of the imaging system.
Figure 3:
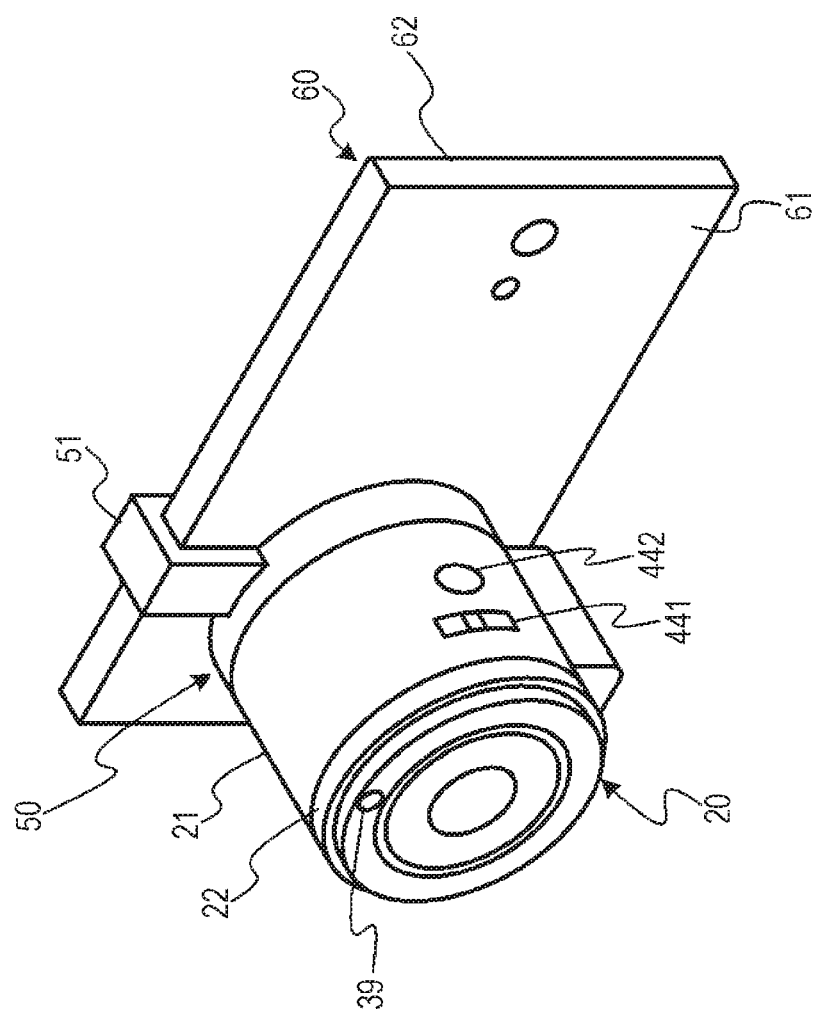
FIG. 3 is a perspective view illustrating an example of the external appearance configuration of the imaging system.
Figure 4:
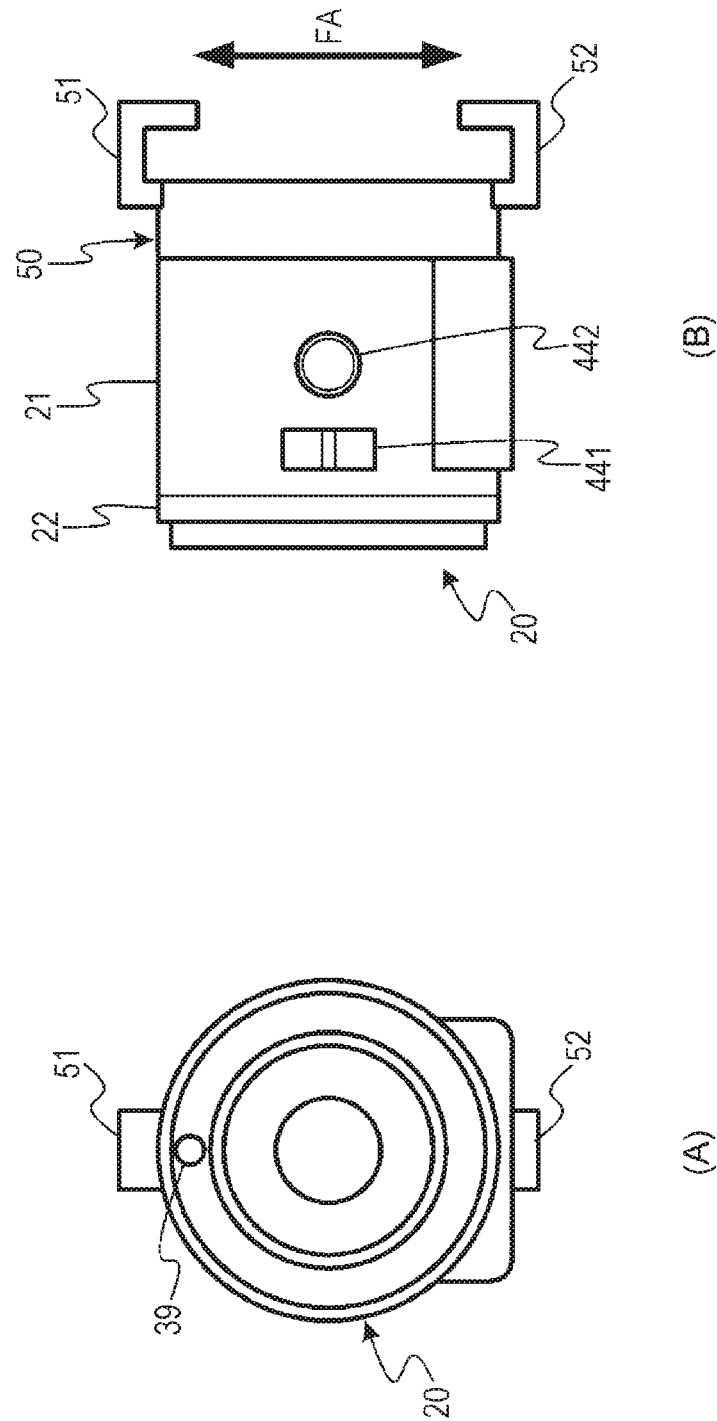
FIG. 4 illustrates a front view and a side view of an imaging device.

FIG. 2 is a view illustrating an example of an external configuration of the imaging system, while FIG. 3 is a perspective view illustrating an example of an external configuration of the imaging system. FIG. 4 illustrates a front view and a side view of the imaging device. Note that the information processing device illustrated in FIG. 2 and FIG. 3 by way of example is constituted by a smartphone.

While not illustrated in the figures, the imaging device 20 includes an imaging optical system, an imaging unit, a signal processing unit, a communication unit, a control unit, and others inside an outer cylindrical unit 21 having a cylindrical shape. An annular control ring 22 is provided at a front end portion of the outer cylindrical unit 21. The imaging device 20 changes a focus position and a zoom position in accordance with rotation of the control ring 22. Accordingly, manual operation such as focus adjustment is performable by using the control ring 22. Moreover, a zoom button 441 and a shutter button 442 are provided on a side surface of the outer cylindrical unit 21. The imaging device 20 changes the zoom position to a wide-angle end or a telephoto end in accordance with operation of the zoom button 441. The imaging device 20 in a still image mode further performs a process for recording a still image in a recording medium, as an image captured at the time of operation of the shutter button 442 by a user. The imaging device 20 in a dynamic image mode further starts or ends recording of a dynamic image in accordance with operation of the shutter button 442. The imaging device 20 further includes an audio input unit 39.

While not illustrated in the figures, the information processing device 60 includes a signal processing unit, a communication unit, a control unit, and others inside an outer housing 61 having a substantially rectangular case-like shape. A display panel 62 is further provided on one surface (front surface) of the outer housing 61. The display panel 62 is constituted by a touch panel. Respective functions are performed on the basis of operation of corresponding predetermined positions on the display panel 62.

The imaging device 20 is equipped with an attachment mechanism unit 50 which connects the imaging device 20 and the information processing device 60 into one piece body. Attachment members 51 and 52 provided on the attachment mechanism unit 50 are configured to be movable in a direction of an arrow FA illustrated in FIG. 4. The user moves the attachment members 51 and 52 in the direction of the arrow FA in accordance with the shape, the size and the like of the information processing device 60, and fits the attachment members 51 and 52 to the outer housing 61 of the information processing device 60 to fix the imaging device 20 to the information processing device 60 into one piece body. Note that (A) of FIG. 2 illustrates a state that the imaging device 20 is fixed to the rear surface side of the information processing device 60 into one piece body, and that (B) of FIG. 2 illustrates a state that the imaging device 20 is fixed to the front surface side (display panel 62 side) of the information processing device 60 into one piece body. The user also moves the attachment members 51 and 52 fitted to the outer housing 61 of the information processing device 60 in a direction opposite to the fitting direction to separate the imaging device 20 and the information processing device 60 from each other.

Note that the attachment mechanism unit 50 is not required to be a component combined with the imaging device 20 as one piece body, but may be an adaptor provided separately from the imaging device 20 for connecting the imaging device 20 and the information processing device 60 into one piece body.

<3. Function Configuration of Imaging Device>

Figure 5:
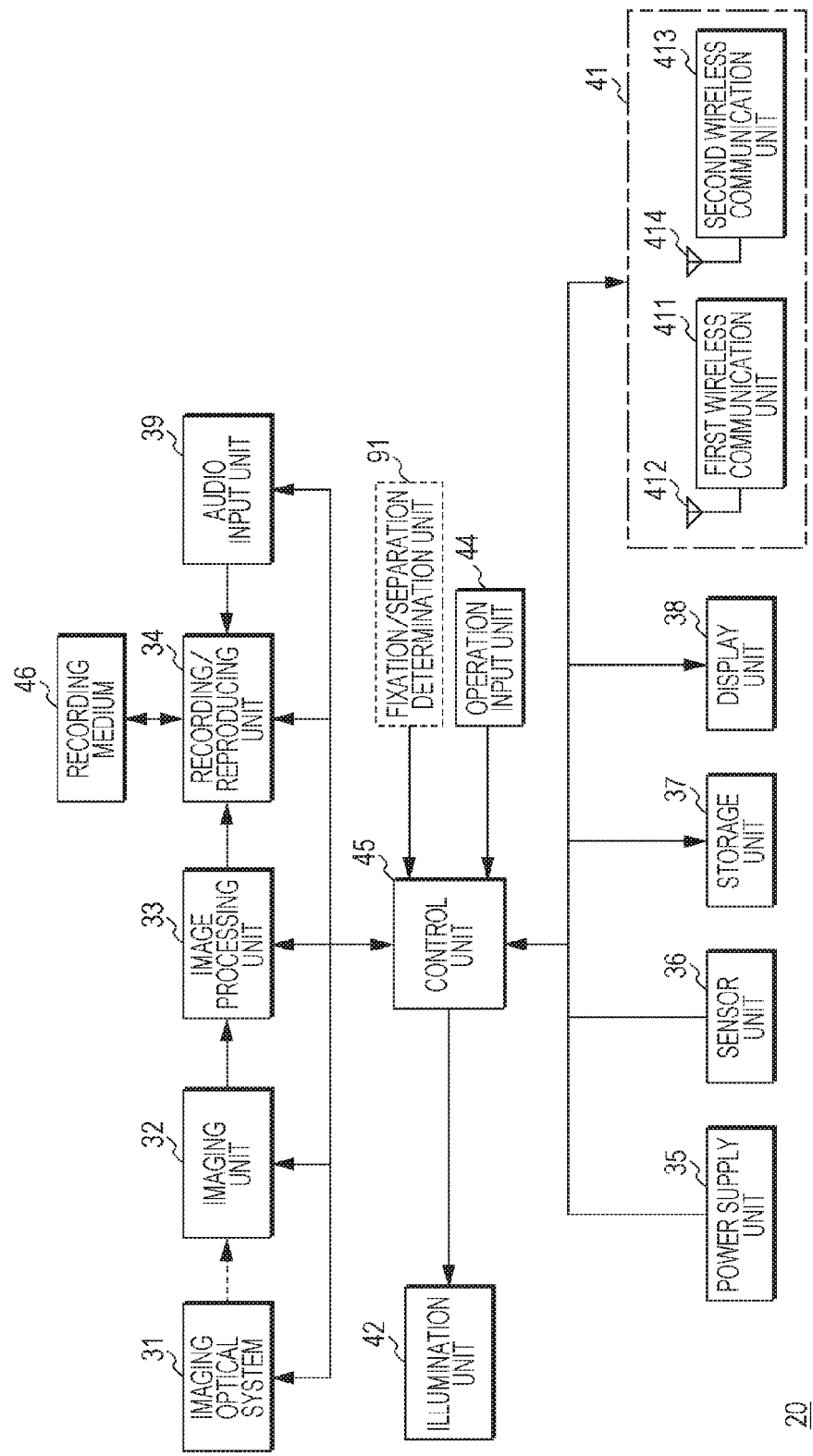
FIG. 5 is a block diagram illustrating an example of a function configuration of the imaging device.

A function configuration of the imaging device is now described. FIG. 5 is a block diagram illustrating an example of the function configuration of the imaging device.

The imaging device 20 includes an imaging optical system 31, an imaging unit 32, an image processing unit 33, a recording/reproducing unit 34, a power supply unit 35, a sensor unit 36, a storage unit 37, a display unit 38, an audio input unit 39, a communication unit 41, an illumination unit 42, an operation input unit 44, and a control unit 45. The imaging device 20 is further equipped with a recording medium 46. The recording medium 46 may be fixed to the imaging device 20, or may be provided as a detachably attached component.

The imaging optical system 31 includes a lens group constituted by a focus lens, a zoom lens and the like, a diaphragm adjustment mechanism, and a driving unit which drives the lens group and the diaphragm adjustment mechanism. The imaging optical system 31 may further include a shutter mechanism, an image stabilizing mechanism, and others.

The imaging unit 32 is constituted by an imaging device such as a charge coupled device (COD) and a complementary metal oxide semiconductor (CMOS). The imaging unit 32 converts a subject optical image formed by the imaging optical system 31 into image data. The imaging unit 32 outputs the image data generated by photoelectric conversion to the image processing unit 33.

The image processing unit 33 performs various types of signal processing and the like for the image data output from the imaging unit 32. For example, the image processing unit 33 performs noise removal, tone correction, edge detection and the like as necessary. The image processing unit 33 outputs the processed image data to the recording/reproducing unit 34.

The recording/reproducing unit 34 records image data and audio data showing captured images, and reproduces recorded image data and audio data while using the recording medium 46 for recording and reproduction. The recording/reproducing unit 34 receives image data showing still images and dynamic images as data generated by the imaging unit 32 and processed by the image processing unit 33, and records the image data in the recording medium 46. The recording/reproducing unit 34 also read image data recorded in the recording medium 46 to reproduces still images and dynamic images. The recording/reproducing unit 34 further receives audio data generated by the audio input unit 39, and records the audio data in the recording medium 46. The recording/reproducing unit 34 also reads audio data recorded in the recording medium 46. Note that the recording/reproducing unit 34 may record image data in the recording medium 46 prior to processing by the image processing unit 33. The recording/reproducing unit 34 may further perform an encoding process for compressing a data volume of image data or audio data recorded in the recording medium 46, and a decoding process for decoding encoded data recorded in the recording medium 46.

The power supply unit 35 is constituted by a buttery and a power supply circuit. The power supply unit 35 supplies power to respective units of the imaging device 20 in accordance with control signals output from the control unit 45.

The sensor unit 36 detects a current position, a posture and a posture change, an orientation, and others of the imaging device 20. The sensor unit 36 is constituted by a sensor for detecting the current position, a sensor for detecting the posture and posture change, and a sensor for detecting the orientation such as an imaging direction, and outputs sensor information indicating a detection result to the control unit 45. For example, the sensor unit 36 detects postures such as inclination of the imaging device 20 with respect to the vertical direction and the horizontal direction, and a position of the imaging device 20 in a rotational direction with respect to a rotation axis corresponding to an optical axis of the imaging optical system 31. The sensor unit 36 further detects a posture change and the like of the imaging device 20. Furthermore, when the sensor information is also output to the information processing device 60 together with image data on captured images, captured images are displayed on the information processing device 60 in consideration of the posture and the like of the imaging device 20. When captured images are formed by the imaging device 20 inclined to the horizontal direction, for example, the information processing device 60 displays images while correcting inclination of the imaging device 20 on the basis of the sensor information. This manner of image display prevents inclined display of a subject which is not actually inclined to the horizontal direction. Note that the sensor unit 36 includes a global positioning system (GPS) positional measurement module as a sensor for detecting the current position, for example. The sensor unit 36 further includes a three-axis acceleration sensor, an inclination sensor, a gyro sensor or the like, for example, as a sensor for detecting the posture and posture change, and a geomagnetic sensor or the like, for example, as a sensor for detecting the orientation of the imaging direction. In addition, the sensor unit 36 may be configured to detect at least any one of the current position, the posture and posture change, the orientation, and other conditions of the imaging device 20.

The storage unit 37 is a recording medium such as a random access memory (RAM) and a read only memory (ROM). The RAM is used as a work area for the control unit 45, for example. On the other hand, the ROM stores programs and the like under which the control unit 45 performs various controls, for example. In addition, the ROM and the RAM store control information and the like utilized when the control unit 45 performs various controls.

The display unit 38 constituted by a liquid crystal display element, a light emitting diode or the like displays a setting state and an operation state of the imaging device 20, an operation state of the information processing device 60, and others.

The audio input unit 39 is constituted by a microphone. The audio input unit 39 makes signal level adjustment of audio signals generated by the microphone, and performs an A/D conversion process for converting audio signals into audio data, and a process for compressing a data volume, for example, and outputs processed audio data to the recording/reproducing unit 34.

The communication unit 41 includes a first wireless communication unit 411, a first antenna 412, a second wireless communication unit 413, and a second antenna 414.

The first wireless communication unit 411 has a near field communication (NFC) function. The first wireless communication unit 411 transmits wireless signals reaching a range approximately from 3 cm to 10 cm, or a short distance of approximately 7 mm depending on design, from the first antenna 412 under control by the control unit 45 to perform NFC communication with an external device contained in a radio wave reaching range (such as information processing device 60). The first wireless communication unit 411 transmits connection information (Wi-Fi configuration) for Wi-Fi automatic connection, or an android application record (AAR), for example, in response to a check command received from the external device. The connection information includes a service set identifier (SSID), a PassKey (encryption key) and the like for Wi-Fi connection.

The second wireless communication unit 413 has a wireless LAN communication function. The second wireless communication unit 413 transmits wireless signals in conformity to communication standards of IEEE 802.11 series via the second antenna 414 under control by the control unit 45 to communicate with an external device (such as information processing device 60). The second wireless communication unit 413 executes Wi-Fi authentication in response to a Wi-Fi connection request transmitted from the external device, for example, and performs a process for establishing a Wi-Fi communication connection with the external device, for example.

The illumination unit 42 emits illumination light toward a subject on the basis of a control signal transmitted from the control unit 45 to capture an image having desired brightness.

The operation input unit 44 detects operations input from the user, and outputs operation signals corresponding to the user operations to the control unit 45. The operation input unit 44 includes the zoom button 441 and the shutter button 442 described above, and is so configured that respective functions have been allocated to physical switches beforehand.

The control unit 45 executes programs recorded in the storage unit 37 to generate control signals on the basis of operation signals supplied from the operation input unit 44, control information stored in the storage unit 37, results of communication with the information processing device 60, fixation/separation information, sensor information and the like. The control unit 45 outputs the generated control signals to respective units to perform imaging control, image processing control, recording/reproduction control, and other controls which allow the imaging device 20 to execute operations corresponding to user operations. The control unit 45 further performs a process for transmitting image data and audio data from the communication unit 41 to the information processing device 60, and a process for controlling operations of the imaging device 20 on the basis of control signals received from the information processing device 60.

The recording medium 46 is a unit detachably attached, and constituted by a memory card or the like to which captured images and the like are written.

Note that fixation/separation information output from the fixation/separation determination unit 91 is further output to the control unit 85 of the information processing device 60 via the control unit 45 or the communication unit 41 when the fixation/separation determination unit 91 is provided on the imaging device 20. In addition, processing by the fixation/separation determination unit 91 may be performed by the control unit 45.

<4. Function Configuration of Information Processing Device>

Figure 6:
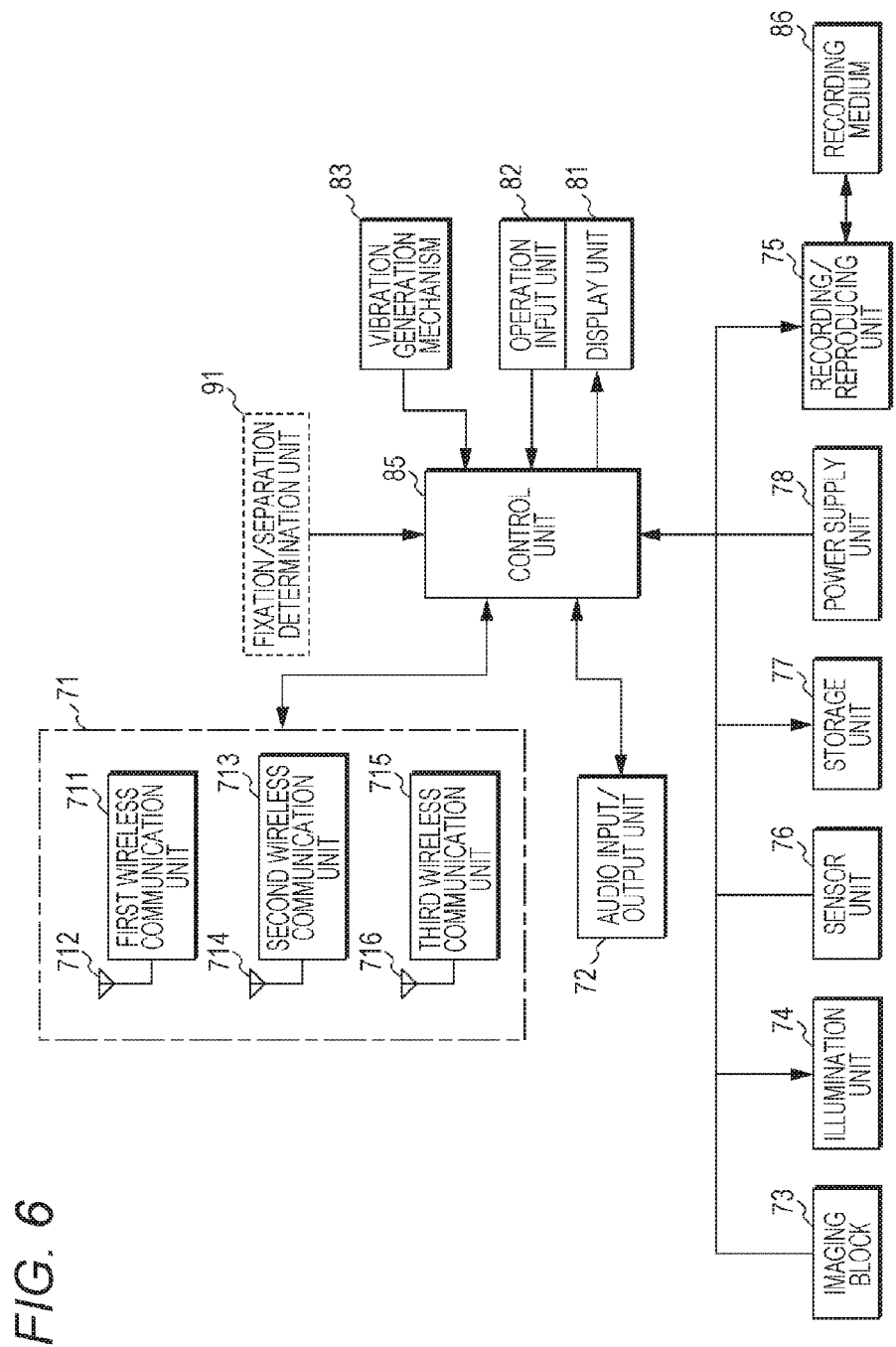
FIG. 6 is a block diagram illustrating an example of a function configuration of an information processing device (e.g., smartphone).

A function configuration of the information processing device is now described. FIG. 6 is a block diagram illustrating an example of the function configuration of the information processing device (such as smartphone).

The information processing device 60 includes a communication unit 71, an audio input/output unit 72, an imaging block 73, an illumination unit 74, a recording/reproducing unit 75, a sensor unit 76, a storage unit 77, a power supply unit 78, a display unit 81, an operation input unit 82, a vibration generation mechanism 83, and the control unit 85. The information processing device 60 is further provided with a recording medium 86 detachably attached to the information processing device 60.

The communication unit 71 includes a first wireless communication unit 711, a first antenna 712, a second wireless communication unit 713, a second antenna 714, a third wireless communication unit 715, and a third antenna 716.

The first wireless communication unit 711 has a near field communication (NFC) function. The first wireless communication unit 711 transmits radio waves via the first antenna 712 under control by the control unit 85 to perform NFC communication with an external device (such as imaging device 20). The second wireless communication unit 713 has a wireless LAN communication function. The second wireless communication unit 713 transmits wireless signals in conformity to communication standards of IEEE 802.11 series via the second antenna 714 under control by the control unit 85 to communicate with the external device (such as imaging device 20). The third wireless communication unit 715 has a cellular phone communication function. The third wireless communication unit 715 transmits wireless signals in conformity to communication standards such as long term evolution (LTE) via the third antenna 716 under control by the control unit 85 to communicate with base stations.

The audio input/output unit 72 is constituted by a speaker and a microphone. The audio input/output unit 72 inputs and outputs voice telephone calls via the communication unit 71. The audio input/output unit 72 further outputs voices on the basis of audio data output from the imaging device 20 via the communication unit 71. The audio input/output unit 72 further outputs reproduction sounds of music content and video content recorded in the storage unit 77 and the recording medium 86. The audio input/output unit 72 further outputs ringtones and the like during use of the cellular phone function.

The imaging block 73 is constituted by an imaging optical system, an imaging device such as a charge coupled device (CCD), and a complementary metal oxide semiconductor (CMOS), a driving unit for driving the imaging optical system and the imaging device, and others. The imaging block 73 generates image data showing captured images.

The illumination unit 74 emits illumination light toward a subject on the basis of control signals received from the control unit 85 to capture images having desired brightness.

The recording/reproducing unit 75 records various types of information, and reads recorded information while using the recording medium 86. The recording/reproducing unit 75 records music content and video content, captured images, mail information, address information associated with other persons and used for wireless communication, and others in the recording medium 86. The recording/reproducing unit 75 further reads various types of information recorded in the recording medium 86.

The sensor unit 76 detects a current position, a posture and a posture change, an orientation, and others of the information processing device 60. The sensor unit 76 is constituted by a sensor for detecting the current position, a sensor for detecting the posture and posture change, and a sensor for detecting the orientation such as an imaging direction, and outputs sensor information indicating a detection result to the control unit 85. Note that the sensor unit 76 includes a global positioning system (GPS) positional measurement module as a sensor for detecting the current position, for example. The sensor unit 76 further includes a three-axis acceleration sensor, an inclination sensor, a gyro sensor, or the like, for example, as a sensor for detecting the posture and posture change, and a geomagnetic sensor or the like, for example, as a sensor for detecting the orientation of the imaging direction. In addition, the sensor unit 76 may be configured to detect at least any one of the current position, the posture and posture change, the orientation and other conditions of the information processing device 60.

The storage unit 77 is a recording medium such as a random access memory (RAM) and a read only memory (ROM). The RAM is used as a work area for the control unit 85, for example. On the other hand, the ROM stores programs and the like under which the control unit 85 performs various controls, for example. In addition, the ROM and the RAM store control information and the like utilized when the control unit 85 performs various controls. Moreover, the RAM is capable of recording music content, video content, programs of various types of applications, captured images supplied from the imaging device 20, mail information, and others.

The power supply unit 78 is constituted by a buttery and a power supply circuit. The power supply unit 78 supplies power to respective units of the information processing device 60 on the basis of control signals output from the control unit 85.

The display unit 81 is constituted by a display element such as a liquid crystal display and an organic EL display. The display unit 81 displays a graphical user interface (GUI) screen, characters and images corresponding to an operation of an application, and others under control by the control unit 85. The display unit 81 further displays images on the basis of image data output from the imaging device 20 under control by the control unit 85.

The operation input unit 82 is constituted by operation switches and a touch panel. The touch panel is provided on a display screen of the display unit 81, and so configured that functions are allocated in correspondence with display of the display screen. The operation input unit 82 generates operation signals corresponding to user operations, and outputs the generated operation signals to the control unit 85. Note that the display panel 62 described above is constituted by the display unit 81 and the operation input unit 82, for example.

The vibration generation mechanism 83 is a mechanism for performing a vibrator function vibrating the information processing device itself. The vibration generation mechanism 83 performs the vibrator function on the basis of a control signal received from the control unit 85 at the time of reception of an incoming call in a state of use of the cellular phone function to notify the user about the incoming call through vibrations of the information processing device 60.

The control unit 85 executes programs recorded in the storage unit 77 to generate control signals on the basis of operation signals supplied from the operation input unit 82, control information stored in the storage unit 77, and others. The control unit 85 outputs the generated control signals to respective units to perform communication control, display control, recording/reproduction control and others allowing the information processing device 60 to perform operations corresponding to user operations. The control unit 85 further controls the communication unit 71 to allow wireless communication with the imaging device 20 and base stations. The control unit 85 further performs a process for starting a predetermined application program on the basis of communication with the imaging device 20, and a process for generating control signals on the basis of operation signals, fixation/separation information, fixation relationship information, and others, and transmitting the generated control signals to the imaging device 20 after a program start. The control unit 85 further performs a process for displaying captured images supplied from the imaging device 20 on the display unit 81, and other processes.

When the fixation/separation determination unit 91 is provided on the information processing device 60, fixation/separation information output from the fixation/separation determination unit 91 is output to the control unit 45 of the imaging device 20 via the control unit 85 or the communication unit 71. Note that processing performed by the fixation/separation determination unit 91 may be performed by the control unit 85.

In addition, when the fixation/separation determination unit 91 is provided on an adaptor for fixing the imaging device 20 and the information processing device 60, the fixation/separation determination unit 91 outputs a determination result to the control unit 45 of the imaging device 20, or the control unit 85 of the information processing device 60.

<5. Operations of Imaging System>
<5-1. Link Between Imaging Device and Information Processing Device>

Figure 7:
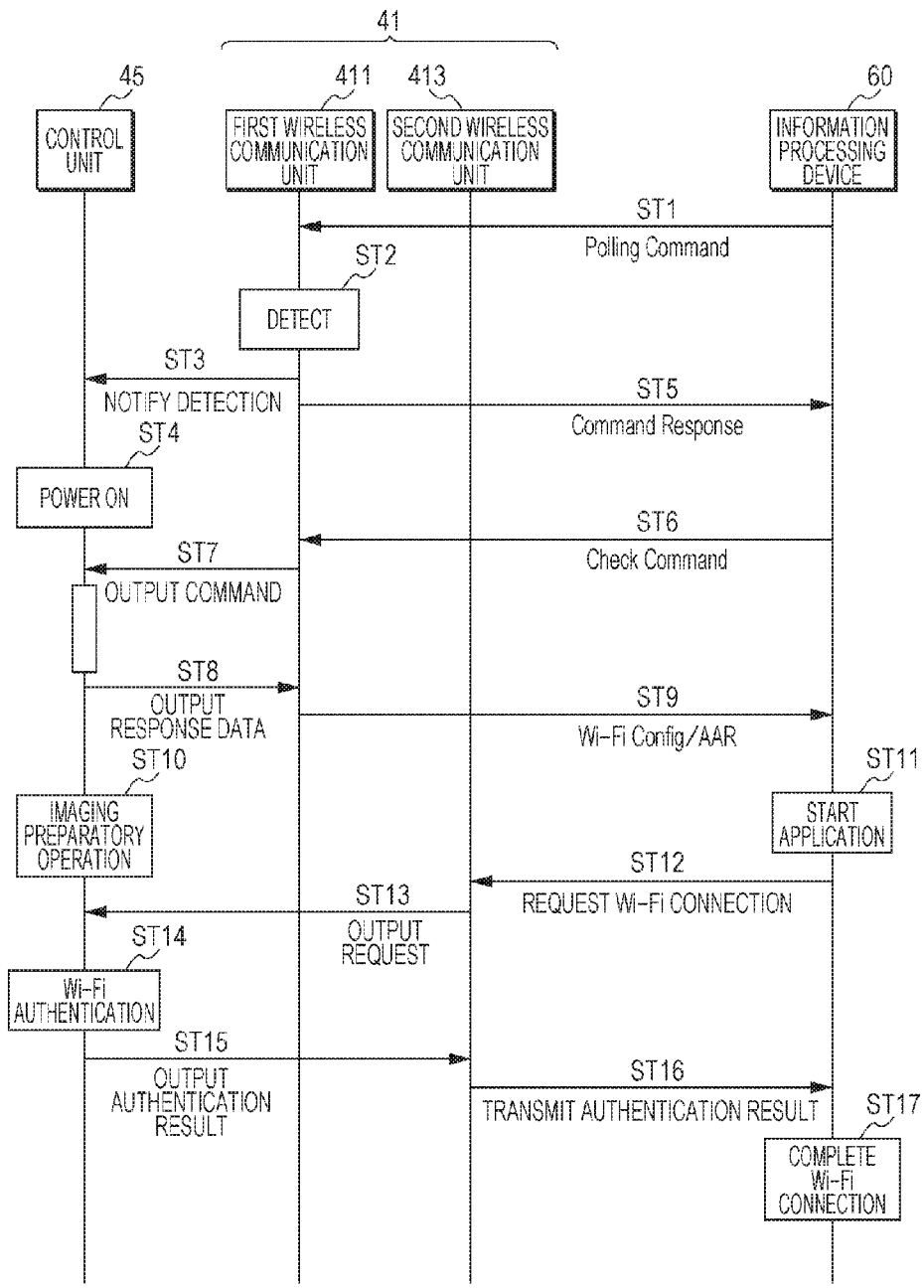
FIG. 7 is a sequence diagram illustrating operation processes performed until a start of a link function between the imaging device and the information processing device.

Operations of the imaging system are now described. FIG. 7 is a sequence diagram showing an operation process performed in the imaging system until a start of a link function between the imaging device and the information processing device.

In step ST1, the information processing device 60 issues a polling command via NFC communication. When the first antenna of the imaging device 20 lies within a predetermined radio wave reaching range from the first antenna of the information processing device 60, the first wireless communication unit 411 of the communication unit 41 of the imaging device 20 detects the issue of the polling command in step ST2.

In step ST3, the first wireless communication unit 411 notifies the control unit 45 about detection of NFC communication from the information processing device 60 in response to this detection.

In step ST4, the control unit 45 generates a control signal in response to the detection notification received from the first wireless communication unit 411, and outputs the generated control signal to the power supply unit 35 to turn on power.

In step ST5, the first wireless communication unit 411 issues a command response via NFC communication in response to the detection of NFC communication.

In step ST6 the information processing device 60 finds an NFC communication partner by detecting the command response transmitted from the imaging device 20, and issues a check command to acquire predetermined information.

In step ST7, the first wireless communication unit 411 of the imaging device 20 outputs the check command received via NFC communication to the control unit 45.

In step ST8, the control unit 45 outputs response data to the first wireless communication unit 411 in response to the check command. The response data in this step contains Wi-Fi configuration and AAR described above, for example.

In step ST9, the first wireless communication unit 411 transmits the response data to the information processing device 60 via NFC communication. Note that the response data may be divided into a plurality of parts and transmitted for each part by repeating foregoing steps ST6 through ST9 a plurality of times.

In step ST10, the control unit 45 performs an imaging preparatory operation. The control unit 45 performs the preparatory operation to allow the imaging device 20 to come into an imaging state. The preparatory operation may further include a preparatory operation for producing a state on the basis of which the imaging state of the imaging device 20 is recognizable. For example, the control unit 45 may perform operations such as extraction of a lens and emission of start sound when the imaging optical system 31 is constituted by a retractable lens. Note that the imaging preparatory operation may be performed after completion of wireless LAN connection.

In step ST11, the information processing device 60 starts a predetermined application in correspondence with the received AAR. For example, processes executed in the predetermined application include a process for receiving image data on captured images transmitted from the imaging device 20 via wireless LAN communication, and displaying the captured images.

In step ST12, the information processing device 60 requests the imaging device 20 to make Wi-Fi connection on the basis of the received Wi-Fi configuration.

In step ST13, the second wireless communication unit 413 of the communication unit 41 of the imaging device 20 outputs the connection request received from the information processing device 60 to the control unit 45.

In step ST14, the control unit 45 executes authentication. Note that authentication may be executed by the second wireless communication unit 413.

In step ST15, the control unit 45 outputs an authentication result to the second wireless communication unit 413.

In step ST16, the second wireless communication unit 413 transmits the authentication result to the information processing device 60. In step ST17, the information processing device 60 completes wireless LAN connection on the basis of a success of authentication. Thereafter, the imaging device 20 and the information processing device 60 start wireless LAN communication.

Note that the order of processes performed until a start of the link function between the imaging device and the information processing device is not limited to the order shown in FIG. 7, but may be other orders as long as link between the imaging device 20 and the information processing device 60 is established via wireless LAN communication or the like.

[5-2. Determination of Fixed/Separated State of Imaging Device and Information Processing Device]

The attachment mechanism unit 50 described above allows use in a fixed state as one piece body as illustrated in (A) of FIG. 8. Moreover, the imaging device 20 and the information processing device 60 including the cellular phone function may be used in a separate state as illustrated in (B) of FIG. 8 while canceling the fixed state. The imaging device 20 or the information processing device 60 thus constructed performs, for the imaging device or the information processing device, different state controls in accordance with selection of the fixed state or the separated state during use of the cellular phone function after a start of the link function.

Fixation/separation information indicating that the imaging device 20 and the information processing device 60 are in the fixed state or the separated state may be generated by the attachment mechanism unit 50, or may be generated by the imaging device 20 or the information processing device 60. For generating the fixation/separation information from the attachment mechanism unit 50, for example, each of the attachment members 51 and 52 may include a switch which is turned on when the attachment members 51 and 52 are fitted to the information processing device 60, and turned off when the attachment members 51 and 52 are not fitted to the information processing device 60. According to a structure including these switches, signals generated by the switches may be used as the fixation/separation information. Moreover, in case of the attachment mechanism unit 50 separable from the imaging device 20, for example, the imaging device 20 may include a switch which is turned on when the attachment mechanism unit 50 is attached to the imaging device 20, and turned off when the attachment mechanism unit 50 is separated from the imaging device 20. According to a structure including these switches, signals generated by the switches may be used as the fixation/separation information. Furthermore, for generating the fixation/separation information from the information processing device 60, for example, the information processing device 60 may have a function for detecting whether or not the attachment members 51 and 52 are fitted to the information processing device 60 to use a detection result of this detection function as the fixation/separation information. Note that a switch may be provided on the information processing device 60 while utilizing the display panel 62 to perform the detection function. The fixed state or the separated state of the imaging device 20 and the information processing device 60 is determined in accordance with the fixation/separation information thus generated.

[5-3. State Control Operation of Imaging System]

Discussed hereinbelow is a state control operation performed when the cellular phone function is used after a start of the link function. Note that the control unit 85 of the information processing device 60 performs a state control in the following description unless specified otherwise. It is also assumed that a monitoring image or a dynamic image during recording is being displayed on the display unit 81 of the information processing device 60 on the basis of image data generated by the imaging device 20 and transmitted to the information processing device 60 after a start of the link function. In addition, discussed herein is a case when a telephone call function is used as the cellular phone function.

[5-3-1. State Control Operation for Incoming Call]

Figure 9:
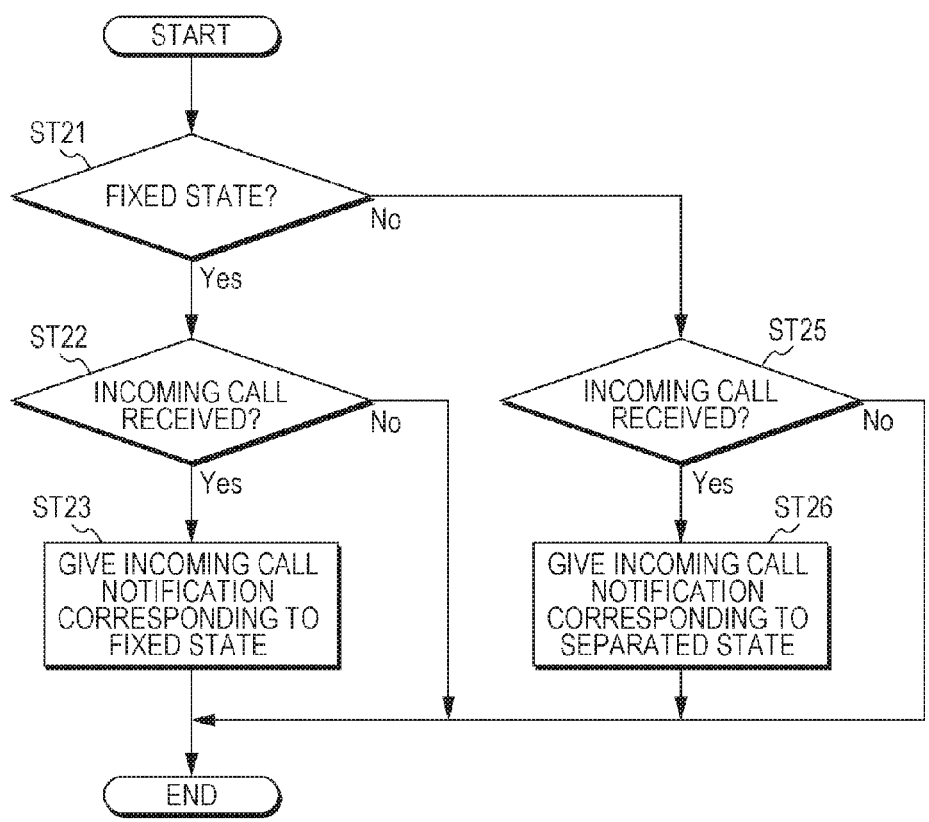
FIG. 9 is a flowchart showing a state control operation for reception of an incoming call.

FIG. 9 is a flowchart showing a state control operation for reception of an incoming call. The control unit 85 of the information processing device 60 repeatedly performs the operation of the flowchart shown in FIG. 9 while switching a state control for an incoming call in accordance with whether or not the imaging device 20 and the information processing device 60 are in the fixed state. In step ST21, the control unit 85 determines whether the current state is the fixed state. The control unit 85 determines whether the imaging device 20 and the information processing device 60 are in the fixed state on the basis of fixation/separation information. The control unit 85 proceeds to step ST22 when determining that the current state is the fixed state, or proceeds to step ST25 when determining that the current state is the separated state.

In step ST22, the control unit 85 determines whether an incoming call has been received. The control unit 85 determines that an incoming call has been received, and proceeds to step ST23 when detecting a call in the telephone call function on the basis of a reception signal from the third wireless communication unit 715. The control unit 85 determines that an incoming call has not been received, and ends the state control for an incoming call when not detecting a call.

In step ST23, the control unit 85 gives incoming call notification corresponding to the fixed state. The control unit 85 gives this incoming call notification by using a notification method considering the fixed state. During recording of information showing images or voices of a subject captured by the imaging device, the control unit 85 gives incoming call notification by using a notification method avoiding effect of the incoming call notification on the information to be recorded. When a notification method vibrating the information processing device, or a notification method outputting a ringtone is used, for example, the images recorded by the imaging device fixed to the information processing device may be blurred with shakes caused by vibrations. In addition, the ringtone or vibration sound of the information processing device is recorded by the imaging device. Accordingly, the information processing device gives incoming call notification by displaying an incoming call notification image, such as an icon showing reception of an incoming call, on the screen of the display unit 81 together with a monitoring image (dynamic image), while adopting a method which avoids effect of incoming call notification on the information to be recorded.

After proceeding from step ST21 to step ST25, the control unit 85 determines whether an incoming call has been received. The control unit 85 determines that an incoming call has been received, and proceeds to step ST26 when detecting a call on the basis of a reception signal from the third wireless communication unit 715. The control unit 85 ends the state control for an incoming call when not detecting a call.

In step ST26, the control unit 85 gives incoming call notification corresponding to the separated state. The control unit 85 gives this incoming call notification by using a notification method considering the separated state. When the information processing device 60 is separated from the imaging device 20 during recording of information such as images and voices of a subject captured by the imaging device, for example, vibrations of the information processing device 60 do not affect the images to be recorded by the imaging device 20. In addition, a ringtone or vibration sound emitted from the information processing device 60 is not easily recorded by the imaging device 20. Accordingly, the control unit 85 performs control for displaying an incoming call notification image, such as an icon showing reception of an incoming call, on the screen of the display unit 81 together with a monitoring image (dynamic image), control for outputting a ringtone from the audio input/output unit, control for vibrating the information processing device by using the vibration generation mechanism, or others. The control unit 85 notifies the user about reception of the incoming call in this manner, and ends the state control for an incoming call.

Figure 10:
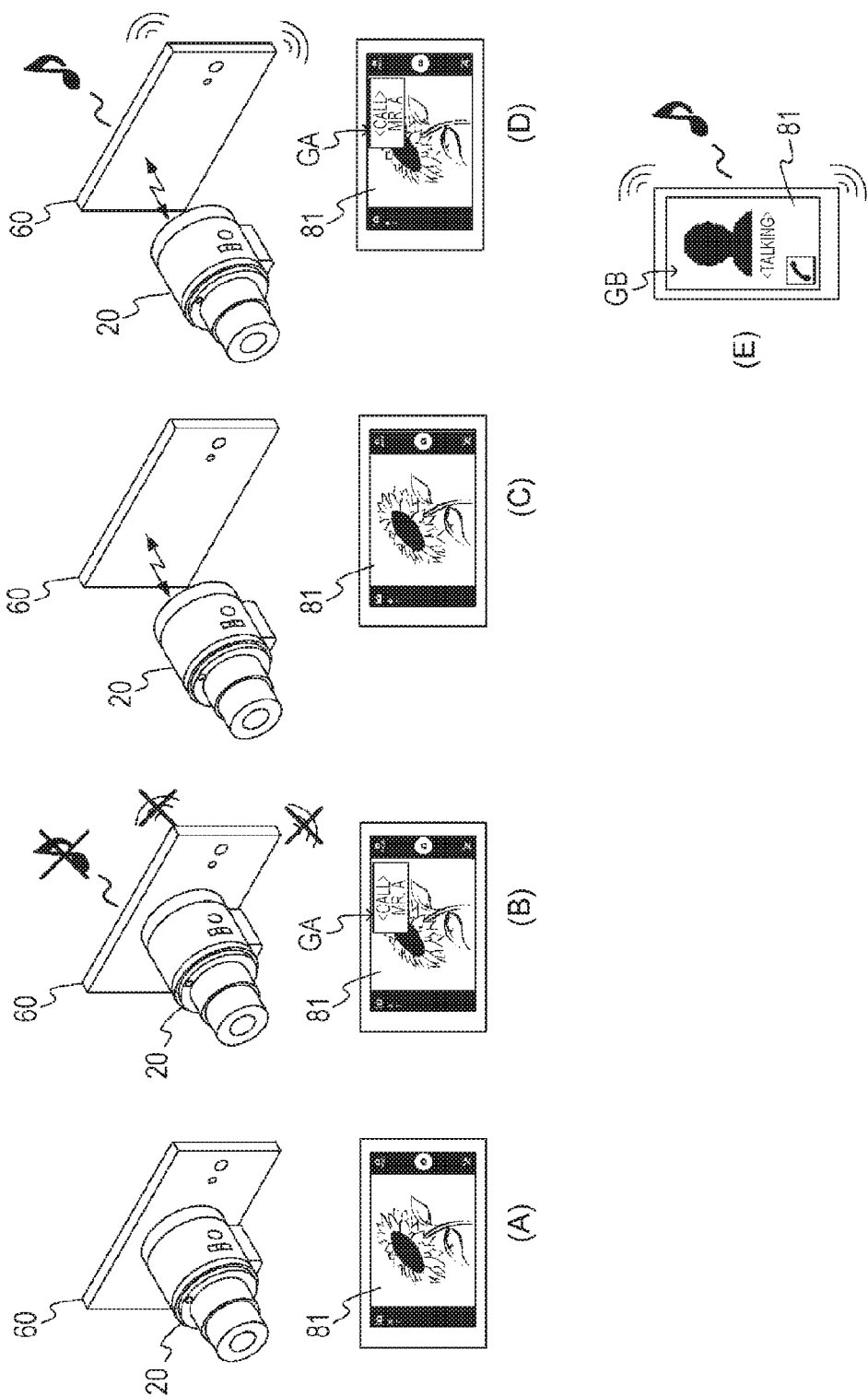
FIG. 10 is a view illustrating an example of an operation when an incoming call is received during imaging.

FIG. 10 illustrates an example of an operation performed when an incoming call has been received during imaging. Note that FIG. 10 shows examples of attachment/detachment states of the imaging device 20 and the information processing device 60, and display screens of the display unit 81 of the information processing device 60.

(A) of FIG. 10 illustrates an example of an operation not at the time of reception of an incoming call in the fixed state of the imaging device 20 and the information processing device 60. In this case, a dynamic image being recorded is displayed on the screen of the display unit 81, for example. (B) of FIG. 10 illustrates an example of an operation at the time of reception of an incoming call in the fixed state of the imaging device 20 and the information processing device 60. At the time of reception of an incoming call in the fixed state, incoming call notification corresponding to the fixed state is given to avoid effect of incoming call notification on the information to be recorded. Accordingly, an incoming notification image GA indicating an incoming call is displayed on the screen of the display unit 81 together with the dynamic image being recorded, for example. In this case, the notification method vibrating the information processing device 60, and the notification method outputting a ringtone are not used. Note that the display area size of the incoming call notification image is small within an identifiable range to reduce a portion invisible behind the incoming call notification image in the dynamic image being recorded on the screen of the display unit 81, for example, during link between the imaging device 20 and the information processing device 60.

(C) of FIG. 10 illustrates an example of an operation not at the time of reception of an incoming call in the separated state of the imaging device 20 and the information processing device 60. A dynamic image being recorded is displayed on the screen of the display unit 81, for example. (D) of FIG. 10 illustrates an example of an operation at the time of reception of an incoming call in the separated state of the imaging device 20 and the information processing device 60. At the time of reception of an incoming call in the separated state, incoming call notification does not easily affect the information to be recorded. In this case, incoming call notification corresponding to the separated state is given. Accordingly, the incoming notification image GA indicating an incoming call is displayed on the screen of the display unit 81 together with the dynamic image being recorded, for example. In this case, the notification method vibrating the information processing device, and the notification method outputting a ringtone are allowed to be used.

In addition, (E) of FIG. 10 illustrates an example of an operation at the time of reception of an incoming call in a state that the information processing device 60 is not linked with the imaging device 20. When the information processing device 60 is not liked with the imaging device 20, a state control different from the state control for the linked state is performed. For example, no captured image is displayed on the screen of the display unit 81 when the information processing device 60 is not linked with the imaging device 20. Accordingly, a control is performed such that an incoming call notification image GB displayed in a display region occupies a wide area of the display region. This control allows effective utilization of the display region for incoming call notification.

Figure 11:
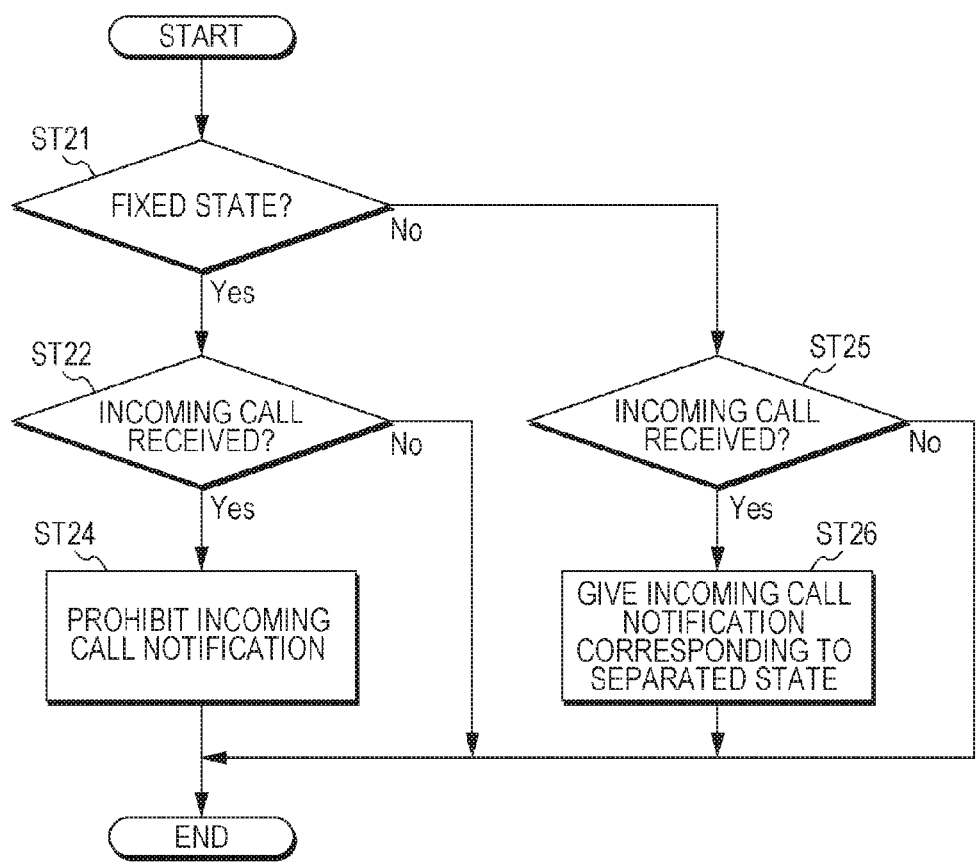
FIG. 11 is a flowchart showing another state control operation for reception of an incoming call.

FIG. 11 is a flowchart showing another state control operation for reception of an incoming call. The control unit 85 of the information processing device 60 repeatedly performs the operation shown in the flowchart in FIG. 11 while switching the state control for reception of an incoming call in accordance with whether or not the imaging device 20 and the information processing device 60 are in the fixed state.

In step ST21, the control unit 85 determines whether the current state is the fixed state. The control unit 85 determines whether the imaging device 20 and the information processing device 60 are in the fixed state on the basis of fixation/separation information. The control unit 85 proceeds to step ST22 when determining that the current state is the fixed state, or proceeds to step ST25 when determining that the current state is the separated state.

In step ST22, the control unit 85 determines whether an incoming call has been received. The control unit 85 proceeds to step ST24 when determining that an incoming call has been received, or ends the state control for reception of an incoming call when determining that an incoming call has not been received.

In step ST24, the control unit 85 prohibits incoming call notification. The control unit 85 prohibits incoming call notification, and ends the state control for reception of an incoming call on the basis of a dynamic image capturing state. Note that the control unit 85, which has prohibited incoming call notification during the dynamic image capturing state, notifies the user about reception of the incoming call after completion of dynamic image capturing. In this case, notification may be given to the user by using sound, vibration or the like as well as an incoming call notification image such as an icon, in the state that dynamic image capturing has been completed.

After proceeding from step ST21 to step ST25, the control unit 85 determines whether an incoming call has been received. The control unit 85 proceeds to step ST26 when determining that an incoming call has been received, or ends the state control for reception of an incoming call when determining that an incoming call has not been received.

In step ST26, the control unit 85 gives incoming call notification corresponding to the separated state. The control unit 85 gives incoming call notification by using a notification method considering the separated state as described above, and ends the state control for reception of an incoming call.

Figure 12:
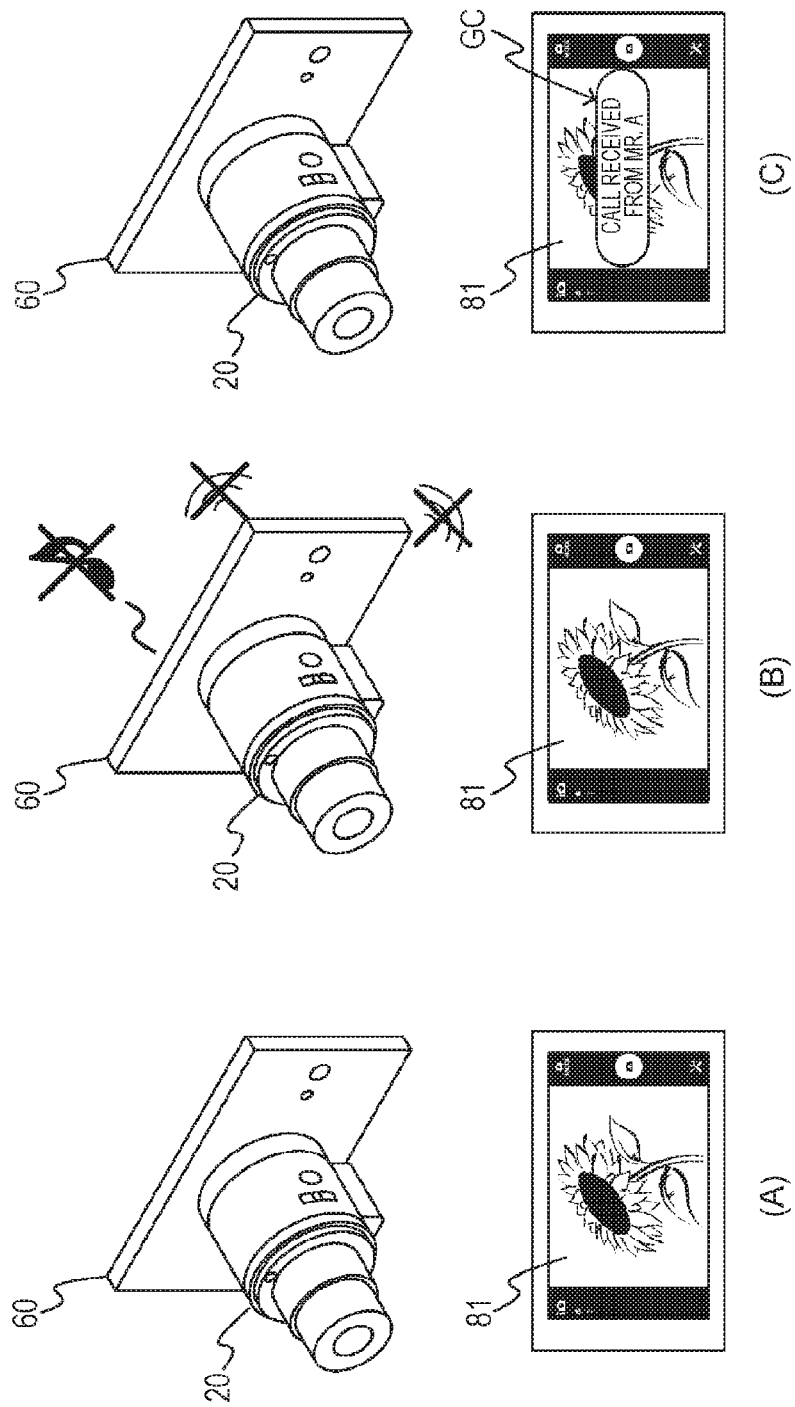
FIG. 12 is a view illustrating an example of another operation when an incoming call is received during imaging.

FIG. 12 illustrates another operation performed when an incoming call has been received during imaging. Note that FIG. 12 illustrates examples of attachment/detachment states of the imaging device 20 and the information processing device 60 (attachment mechanism unit not shown), and display screens of the display unit 81 of the information processing device 60.

(A) of FIG. 12 illustrates an example of an operation not at the time of reception of an incoming call in the fixed state of the imaging device 20 and the information processing device 60. In this case, a dynamic image being recorded is displayed on the screen of the display unit 81, for example.
(B) of FIG. 12 illustrates an example of an operation at the time of reception of an incoming call in the fixed state of the imaging device 20 and the information processing device 60. Incoming call notification is prohibited in the fixed state. Accordingly, the operation performed not at the time of reception of an incoming call is continued even when an incoming call is received. (C) of FIG. 12 illustrates an example of an operation at the time of completion of dynamic image capturing in the fixed state of the imaging device 20 and the information processing device 60. At the time of completion of dynamic image capturing, an incoming call notification image GC indicating that an incoming call has been received during imaging is displayed on the screen of the display unit 81.

In addition, selection of the process in step ST23 shown in FIG. 9 or the process in step ST24 shown in FIG. 11 may be determined in accordance with an operation mode. For example, the process in step ST24 may be selected to capture images without effect of reception of an incoming call when an imaging priority mode is set.

In addition, the imaging priority mode may be set in the separated state as well. In the imaging priority mode set in the separated state, for example, recording of a ringtone is securely avoidable even in a condition of the information processing device and the imaging device located close to each other in the separated state when incoming call notification with an image or sound is prohibited. Moreover, no incoming notification is displayed on the screen, wherefore the user is allowed to check the imaging state in a preferable condition regardless of the incoming call state.

Furthermore, a priority level may be individually set for each of incoming call notification functions to allow issue of only incoming call notification with a priority level higher than a level designated by the user.

Note that the imaging device gives incoming call notification by using the display unit in response to reception of an incoming call by the information processing device when the imaging device and the information processing device are in the separated state. The imaging device gives incoming call notification by blinking a light emitting diode of the display unit at the time of reception of an incoming call by the information processing device, for example. This method allows the user to easily recognize reception of an incoming call even when the information processing device is located far away, for example.

In addition, while discussed above is the operation performed when a call is received in the telephone call function, the foregoing state control is performed at the time of reception of a mail when the mail function is used.

As described above, the control unit performs, for the imaging device or the information processing device, such a control which switches state controls different for each of the fixed state and the separated state, i.e., such a control which switches the incoming call notification method avoiding effect of incoming call notification on images, voices or the like to be recorded, at the time of reception of the incoming call in the cellular phone function. Accordingly, the imaging system of the present technology is capable of performing an imaging operation while avoiding effect of incoming call notification.

[5-3-2. State Control Operation for Incoming Call Response]

Figure 13:
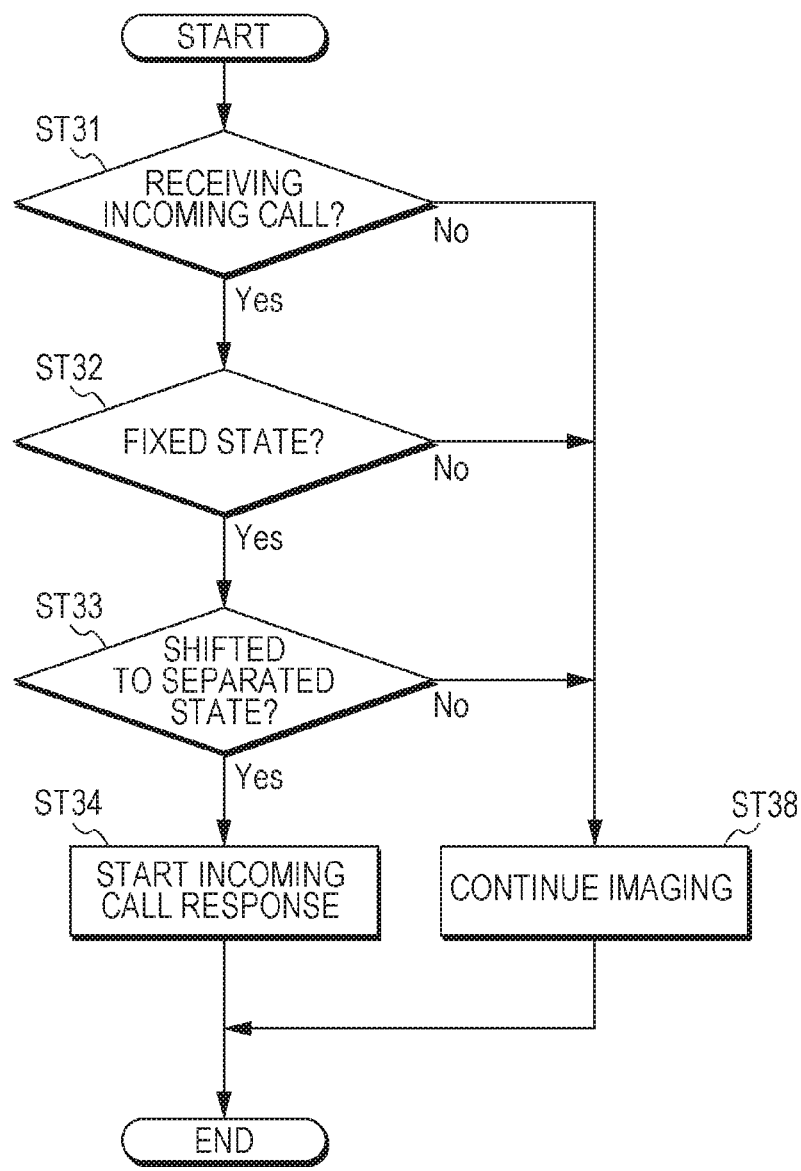
FIG. 13 is a flowchart showing a state control operation for an incoming call response.

FIG. 13 is a flowchart showing a state control operation for an incoming call response. In step ST31, the control unit 85 determines whether the current state is an incoming call receiving state. The control unit 85 proceeds to step ST32 when determining that the current state is an incoming call receiving state, or proceeds to step ST38 when determining that the current state is not an incoming call receiving state.

In step ST32, the control unit 85 determines whether the control unit 85 is in the fixed state. The control unit 85 determines whether the imaging device 20 and the information processing device 60 are in the fixed state on the basis of fixation/separation information, and proceeds to step ST33 when determining that the current state is the fixed state, or proceeds to step ST38 when determining that the current state is the separated state.

In step ST33, the control unit 85 determines whether the state has been shifted to the separated state. The control unit 85 determines whether the imaging device 20 and the information processing device 60 have been shifted from the fixed state to the separated state on the basis of fixation/separation information, and proceeds to ST34 when determining that the state has been shifted to the separated state, and proceeds to step ST38 when determining that the fixed state has been maintained.

In step ST34, the control unit 85 starts a response to an incoming call. The control unit 85 determines an instruction of a start of a response to the incoming call on the basis of the state shift from the fixed state to the separated state, and controls respective units to produce a state communicative with a calling source. The control unit 85 also ends the imaging mode, and ends the state control for reception of an incoming call when the imaging device is in the imaging mode so as to eliminate a possibility of discontinuation of imaging of a desired subject by the user as a result of a response to the incoming call.

In step ST38 reaching from steps ST31, 32, and 33, the control unit 85 continues imaging. More specifically, the control unit 85 continues display of a dynamic image being recorded on the display unit 81, while ending the state control for the incoming call response.

Figure 14:
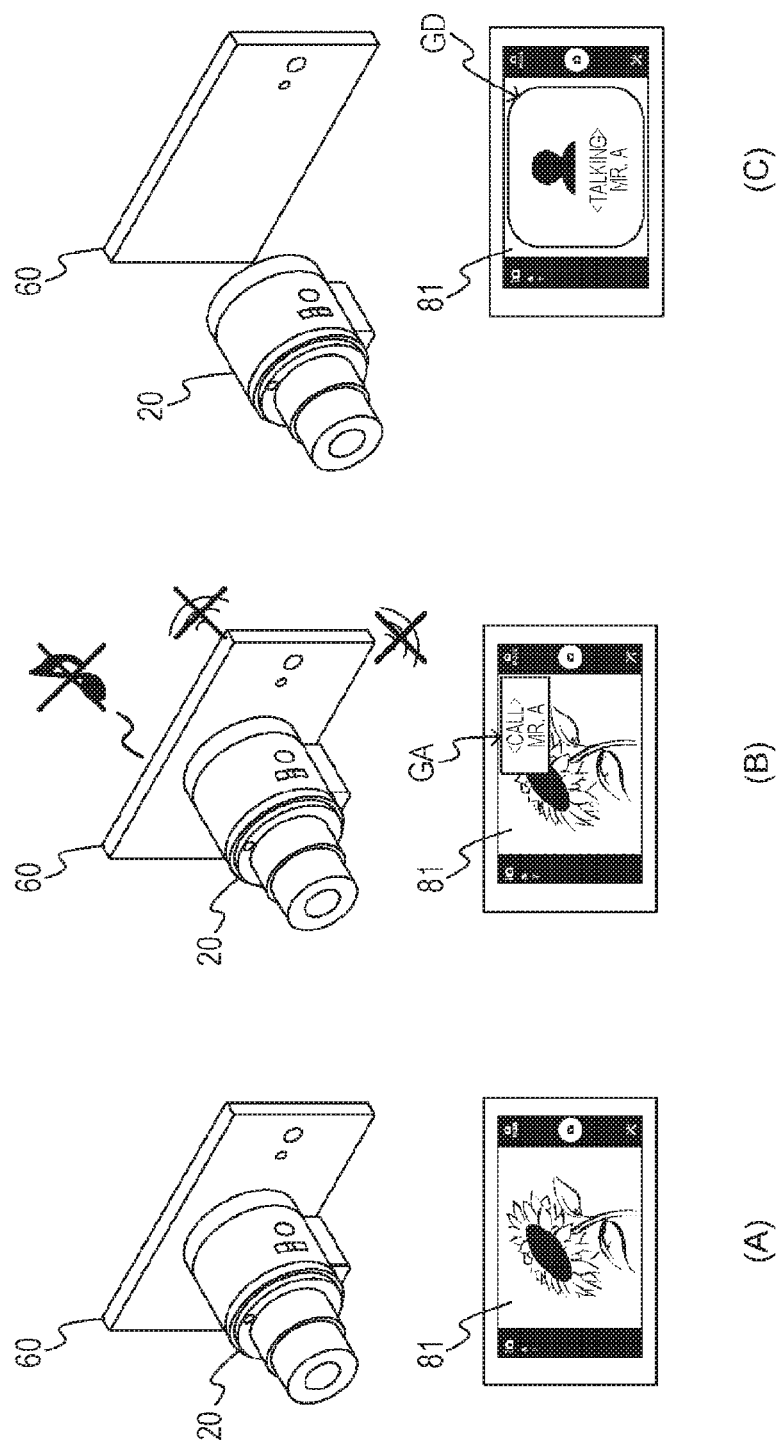
FIG. 14 is a view illustrating an example of an operation for an incoming call response.

FIG. 14 illustrates an example of the operation for an incoming call response. Note that FIG. 14 illustrates examples of attachment/detachment states of the imaging device 20 and the information processing device 60 (attachment mechanism unit not shown), and display screens of the display unit 81 of the information processing device 60.

(A) of FIG. 14 illustrates an example of an operation not at the time of reception of an incoming call in the fixed state of the imaging device 20 and the information processing device 60. In this case, a dynamic image being recorded is displayed on the screen of the display unit 81, for example. (B) of FIG. 14 illustrates an example of an operation at the time of reception of an incoming call in the fixed state of the imaging device 20 and the information processing device 60. At the time of reception of an incoming call in the fixed state, incoming call notification corresponding to the fixed state is given to avoid effect of incoming call notification on the information to be recorded. Accordingly, an incoming notification image GA indicating an incoming call is displayed on the screen of the display unit 81 together with the dynamic image being recorded, for example. In addition, the notification method vibrating the information processing device 60, and the notification method outputting a ringtone are not used to avoid effect of incoming call notification on the information to be recorded. (C) of FIG. 14 illustrates an example of the operation for an incoming call response in the fixed state of the imaging device 20 and the information processing device 60. The fixed state of the imaging device 20 and the information processing device 60 is shifted to the separated state by the user as illustrated in the figure. In this case, the information processing device 60 recognizes the shift from the fixed state to the separated state, and starts a response to an incoming call. Accordingly, an incoming call response image GD indicating an incoming call responding state is displayed on the screen of the display unit 81.

Figure 15:
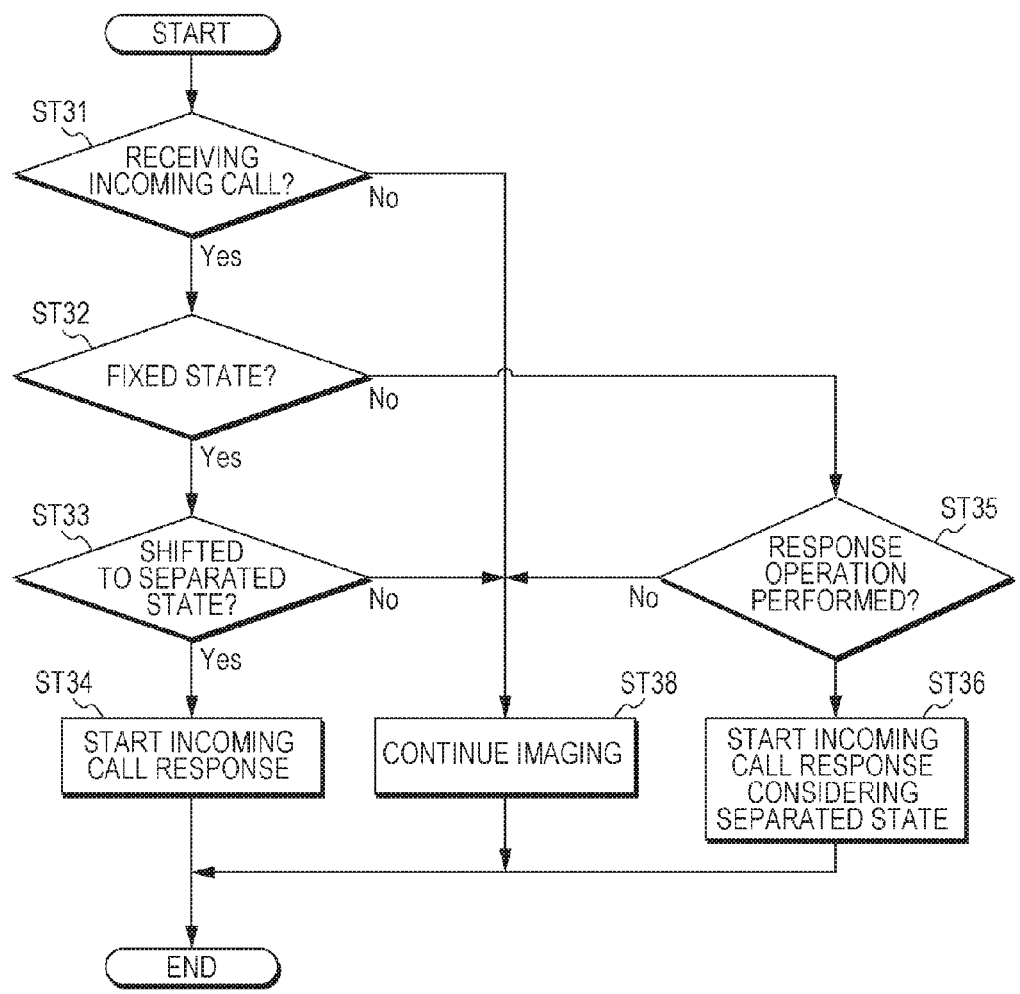
FIG. 15 is a flowchart showing another state control operation for an incoming call response.

FIG. 15 is a flowchart showing another state control operation for an incoming call response. In step ST31, the control unit 85 determines whether the current state is an incoming call receiving state. The control unit 85 proceeds to step ST32 when determining that the current state is an incoming call receiving state, or proceeds to step ST38 when determining that the current state is not an incoming call receiving state.

In step ST32, the control unit 85 determines whether the control unit 85 is in the fixed state. The control unit 85 determines whether the imaging device 20 and the information processing device 60 are in the fixed state on the basis of fixation/separation information, and proceeds to step ST33 when determining that the current state is the fixed state, or proceeds to step ST35 when determining that the current state is the separated state.

In step ST33, the control unit 85 determines whether the state has been shifted to the separated state. The control unit 85 determines whether the imaging device 20 and the information processing device 60 have been shifted from the fixed state to the separated state on the basis of fixation/separation information, and proceeds to ST34 when determining that the state has been shifted to the separated state, and proceeds to step ST38 when determining that the fixed state has been maintained.

In step ST34, the control unit 85 starts a response to an incoming call. The control unit 85 determines an instruction of a start of a response to the incoming call on the basis of the state shift from the fixed state to the separated state, and controls respective units to produce a state communicative with a calling source. The control unit 85 also ends the imaging mode, and ends the state control for reception of an incoming call when the imaging device is in the imaging mode so as to eliminate a possibility of discontinuation of imaging of a desired subject by the user as a result of a response to the incoming call.

In step ST35 reaching from step ST32 the control unit 85 determines whether a response operation has been performed. The control unit 85 proceeds to step ST36 when determining a user operation for responding to the incoming call has been performed, for example, or proceeds to step ST38 when determining that the response operation has not been performed.

In step ST36, the control unit 85 starts the response to the incoming call while considering the separated state. The control unit 85 responds to the incoming call while allowing the imaging device 20 separated from the information processing device 60 to continue imaging. For example, the control unit 85 starts telephone call communication in a speaker phone mode (hands-free mode), and ends the state control for the incoming call response at the time of reception of a telephone call.

In step ST38 reaching from steps ST31, 33, and 35, the control unit 85 continues imaging. More specifically, the control unit 85 continues display of a dynamic image being recorded on the display unit 81, while ending the state control for the incoming call response.

FIG. 16 illustrates an example of another operation for an incoming call response of FIG. 16 illustrates an example of an operation not at the time of reception of an incoming call in the separated state of the imaging device 20 and the information processing device 60. The user is capturing a self-image by using the imaging device 20. In addition, the user is holding the information processing device 60 by hand. When the information processing device 60 determines reception of an incoming call in this state, such as a telephone call, the information processing device 60 generates sound or vibration to produce a call based on the separated state of the imaging device 20 and the information processing device 60. (B) of FIG. 16 illustrates an example of an operation at the time of an incoming call response in the separated state of the imaging device 20 and the information processing device 60. The control unit 85 starts telephone call communication in the speaker phone mode (hands-free mode) when a telephone call is received. This method for the incoming call response easily realizes telephone call communication while continuing the state of capturing a self-image.

In addition, at the time of a response to an incoming call after a state shift of the imaging device and the information processing device to the separated state, an incoming call response start and an incoming call responding state are displayed by using the display unit of the imaging device. When the incoming call response is initiated, the imaging device shifts the blinking state of the light emitting diode of the display unit to a lighting state, for example. According to this method, the incoming call responding state of the information processing device is easily recognizable on the basis of display of the display unit of the imaging device.

On the other hand, during use of the mail function, the incoming call response operation is performed by a state control which automatically displays contents of a received mail on the screen of the display unit 81, for example.

As described above, at the time of an incoming call response in the cellular phone function, the control unit determines an instruction of a start of an incoming call response to the incoming call for the imaging device or the information processing device on the basis of the state shift from the fixed state to the separated state. Accordingly, the imaging system of this technology is capable of easily responding to reception of an incoming call.

[5-3-3. State Control Operation From Incoming Call Response Start to Incoming Call End]

FIG. 17 is a flowchart showing a state control operation performed from an incoming call response start to an incoming call end. In step ST41, the control unit 85 determines whether an incoming call response has started. The control unit 85 proceeds to step ST42 when determining that an incoming call response has started, or ends the state control for an incoming call response end when determining that a response to an incoming call has not been given.

In step ST42, the control unit 85 performs a response handling control. When determining that a response to an incoming call has been given, the control unit 85 performs a response handling control to allow operation of the imaging device 20 in a manner appropriate for the response. For a response to an incoming call, for example, an interest of the user has been shifted from an imaging operation to a response operation. Accordingly, an unnecessary image may be recorded in an imaging direction different from a direction of a desired subject, for example. Accordingly, the control unit 85 transmits a control signal corresponding to a response handling control to the imaging device 20, and performs a state control for interrupting capturing of a dynamic image, a state control for storing the retractable lens in accordance with interruption of imaging, and a state control for reducing power consumption, such as a state control for switching a power supply mode to an off-state, a standby state, or a power saving mode, for example. The control unit 85 performs the response handling control in this manner, and proceeds to step ST43.

In step ST43, the control unit 85 determines whether the current state is an incoming call response end. The control unit 85 determines an instruction of an end of the incoming call response to reception of the telephone call based on an operation for ending telephone call communication, or a state shift from the separated state to the fixed state during the incoming call response. The control unit 85 proceeds to step ST44 when determining that the current state is the incoming call response end. On the other hand, the control unit 85 ends the state control for an incoming call response end when determining that the current state is not the incoming call response end.

In step ST44, the control unit 85 determines whether the state at the time of reception of the incoming call is an imaging state. When determining that the state at the time of reception of the incoming call is an imaging state, the control unit 85 proceeds to step ST45. In addition, when determining that the state at the time of reception of the incoming call is not an imaging state, the control unit 85 ends the state control for the incoming call response end.

In step ST45, the control unit 85 performs an imaging restart control. The control unit 85 generates a control signal, and transmits the generated control signal to the imaging device 20 to restart the imaging operation of the imaging device 20. The control unit 85 performs a state control for shifting the power supply mode of the imaging device 20 from the off-state, the standby state, the power saving mode or the like to the on-state, a control state for extracting the stored lens, and a state control for displaying a monitoring image on the display unit 81 of the information processing device 60, for example. Alternatively, when recording of captured images or voices is ended on the basis the control for an incoming call response, the control unit 85 may automatically start recording, or come into a standby state waiting for a recording start instruction issued from the user in a state displaying a monitoring image. Moreover, selection of the operations may be set by the user beforehand. In case of selection of the mode for an automatic start of recording herein, recording of captured images or voices is automatically started in accordance with an end of telephone call communication or the mail function. On the other hand, in case of selection of the mode for standby state, recording of unnecessary captured images at the time of restart of the imaging operation is avoidable when capturing of a desired image is allowed only after an issue of a recording start instruction from the user. In the manner described above, the control unit 85 restarts imaging while ending the state control for an incoming call response end.

FIG. 18 illustrates an example of the operation for an incoming call end. (A) of FIG. 18 illustrates an example of an operation for an incoming call response in the fixed state of the imaging device 20 and the information processing device 60. The control unit 85 of the information processing device 60 interrupts capturing of a dynamic image by the imaging device 20, and stores the lens to switch the power supply mode to the off-state, the standby state, the power saving mode or the like, for example. (B) of FIG. 18 illustrates an example of the operation for an incoming call response end in the fixed state of the imaging device 20 and the information processing device 60. During interruption of capturing of a dynamic image under the response handling control for an incoming call response, the control unit 85 of the information processing device 60 returns the power supply mode of the imaging device 20 to the on-state, extracts the lens, and displays a monitoring image on the screen of the display unit 81, for example. Thereafter, the control unit 85 restarts the imaging operation in accordance with a user operation.

Note that the imaging device displays an incoming response end by using the display unit in accordance with a response end of the information processing device in the separated state of the imaging device and the information processing device. The imaging device shifts the lighting state of the light emitting diode of the display unit to a light-off state at the time of a response end of the information processing device. According to this method, a response end of the information processing device is easily recognizable on the basis of display of the display unit of the imaging device.

In addition, during use of the mail function, the operation for an incoming call response end is performed by ending display of contents of a mail, and displaying a monitoring image in the manner described above, for example.

As described above, the control unit determines an instruction of an incoming call response end on the basis of a state shift from the separated state to the fixed state. In addition, at the time of an incoming call response end, the control unit performs a state control for allowing restart of the operation interrupted on the basis of the incoming call response. Accordingly, the imaging system of this technology is capable of easily achieving an end of an incoming call response, and a returning process for returning to an operation performed prior to an incoming call response.

[5-3-4. Other State Control Operations]

Incidentally, the state control operations of the imaging device 20 and the information processing device 60 are not limited to the operations described above. FIG. 19 shows an example of a list of state control operations performed by the imaging device 20 and the information processing device 60, including the foregoing operations. The imaging device 20 and the information processing device 60 perform, for the imaging device or the information processing device during the cellular phone function, different controls in accordance with selection of the fixed state or the separated state as illustrated in FIG. 19.

<Reception of Incoming Call>

In the fixed state of the imaging device 20 in an operation mode for recording a still image or a dynamic image, the information processing device 60 gives incoming call notification by displaying an icon (incoming call notification image) of a size smaller than the size of the corresponding icon displayed when the imaging device 20 and the information processing device 60 are not linked with each other. This manner of display of a smaller icon allows recognition of an incoming call simultaneously with a check of a captured image. In addition, in case of continuous capturing or voices of still image recording, or dynamic image recording, the information processing device 60 prohibits output of ringtones and vibrations. In the separated state, the information processing device 60 gives incoming call notification by displaying an icon of a smaller size than the size of the corresponding size when the imaging device 20 and the information processing device 60 are not linked with each other. In this case, the information processing device 60 also outputs ringtones and vibrations. Note that the imaging device 20 may display reception of an incoming call by blinking display or other methods.

<Incoming Call Response Start>

When an incoming call is received in the fixed state of the imaging device 20 in an operation mode for recording a still image or a dynamic image, the information processing device 60 allows telephone call communication in a normal telephone call mode, or displays contents of a mail on the basis of a state shift to the separated state. The imaging device 20 ends the imaging mode, and retracts the lens, for example, on the basis of the state shift to the separated state. Alternatively, the lens may be retracted on the basis of a setting which interrupts recording in a non-recording state, a state shifting period, or like conditions. In the separated state, the information processing device 60 allows telephone call communication in a speaker phone mode in response to a telephone call start operation, or performs an operation of the mail function in response to a mail function selection operation, for example. Note that the imaging device 20 may display an incoming call response start by lighting display, for example.

<Incoming Call Responding State>

When an incoming call is received in the fixed state of the imaging device 20 in an operation mode for recording a still image or a dynamic image, the information processing device 60 displays a telephone call and mail-related matters, and inputs and outputs voices. The imaging device 20 shifts to a power supply off state, a standby state, a power saving mode or the like to reduce power consumption. In the separated state, the information processing device 60 displays a telephone call and mail-related matters, and inputs and outputs voices. Note that the imaging device 20 may display an incoming call responding state by lighting display, for example.

<Incoming Call Response End>

When an incoming call is received in the fixed state of the imaging device 20 in an operation mode for recording a still image or a dynamic image, the information processing device 60 ends telephone call communication and the mail function on the basis of a state shift to the original state, i.e., a state shift from the separated state to the fixed state. In addition, the imaging device 20 restarts the imaging mode and extracts the lens, for example, on the basis of the state shift to the original state. Note that a dynamic image recording operation may be automatically started in accordance with a state shift, or a recording operation may be started in accordance with an instruction from the user. In the separated state, the information processing device 60 ends telephone call communication and the mail function on the basis of a telephone call end operation or a mail function operation. Note that the imaging device 20 may give response end notification by turning off lighting of display.

<Alarm Notification and Others>

When an abnormal condition or the like occurs during use of the cellular phone function, alarm notification is given. At the time of the alarm notification, different state controls are performed in accordance with the condition of the fixed state and the separated state for the imaging device or the information processing device. In the fixed state of the imaging device and the information processing device, for example, alarm notification is given by alarm notification corresponding to the fixed state, such as display of an icon on the basis of which the contents of the alarm are identifiable on the information processing device, so as to avoid effect of the alarm on information generated by the imaging device. On the other hand, in the separated state of the imaging device and the information processing device, alarm notification by the information processing device does not easily affect information generated by the imaging device. Accordingly, alarm notification corresponding to the separated state is given, such as icon display, alarm sound, vibrations and the like on the basis of which the contents of the alarm are identifiable on the information processing device. When different state controls are performed in this manner in accordance with the condition of the fixed state or the separated state for the imaging device or the information processing device at the time of an abnormal condition, alarm notification to be given does not affect information such as images and voices of a subject to be recorded. Note that any of controls selected from FIG. 19, or controls not shown in FIG. 19 may be performed for the state control.

In addition, while the state control is performed by the control unit of the information processing device in the foregoing description, the state control may be performed by the control unit of the imaging device. In this case, the control unit of the imaging device acquires wireless signals indicating information showing the use state of the cellular phone function from the information processing device. The control unit of the imaging device generates control signals for controlling operations of the information processing device on the basis of the acquired information, and transmits the generated control signals to the information processing device as wireless signals. In this case, state controls of the imaging system are achievable in a manner similar to the state controls performed by the control unit of the information processing device. In addition, when the state control is performed by a control unit provided separately from the imaging device and the information processing device, control signals are generated on the basis various information acquired from the imaging device and the information processing device, and supplied to the respective devices. In this case, the foregoing state controls are achievable even when the imaging device and the information processing device are not linked with each other.

Furthermore, even in the separated state of the imaging device and the information processing device, a ringtone from the information processing device is not recorded by the imaging device when the imaging device and the information processing device are located far from each other. Accordingly, in the separated state of the imaging device and the information processing device, state controls may be performed in accordance with the distance between the imaging device and the information processing device. When the imaging device and the information processing device are located within a predetermined separation distance, for example, a ringtone is not emitted even in the separated state of the imaging device and the information processing device. In this case, an imaging operation considering effect of the cellular phone function of the information processing device is performed in accordance with the separation distance. Note that the separation distance between the imaging device and the information processing device may be measured on the basis of signal intensity in wireless communication between the imaging device and the information processing device, or by the use of a distance measurement sensor utilizing ultrasonic waves, light and the like.

In addition, a series of processes described in the specification may be executed by hardware, software, or a complex configuration of hardware and software. For executing the processes by software, programs recording process sequences are installed in a memory incorporated in dedicated hardware within a computer to be executed by the computer. Alternatively, the programs are installed in a general-purpose computer capable of executing various types of processes to be executed by the general-purpose computer.

For example, the programs may be recorded in a hard disk, a solid state drive (SSD) or a read only memory (ROM) as a recording medium beforehand. Alternatively, the programs may be temporarily or permanently stored (recorded) in a flexible disk, a compact disc read only memory (CD-ROM), magneto optical (MO) disc, a digital versatile disc (DVD), a blu-ray disc (BD) (registered trademark), a magnetic disk, a semiconductor memory card, or other removable recording media. These removable recording media may be provided as so-called package software.

In addition, the programs may be installed in a computer not only from a removable recording medium, but also via wireless or wired transfer to a computer through a network such as a local area network (LAN) and the Internet from a download site. A computer having received the programs transferred in this manner installs the programs in a recording medium such as a built-in hard disk.

Note that effects to be offered are not limited to the effects described in the present specification presented only by way of example, but may include additional effects not described herein. Furthermore, it is not intended that the present technology be interpreted with limitations to the foregoing embodiment of the technology. The embodiment of this technology disclosed herein is presented only by way of example of the present technology. It is obvious that those skilled in the art may add corrections or substitutions to the embodiment without departing from the subject matters of the present technology. Accordingly, the subject matters of the present technology should be understood only on the basis of the appended claims.

In addition, the imaging system according to the present technology may have the following configurations.

(1) An imaging system including a control unit that performs, for an imaging device or an information processing device including a cellular phone function, different state controls in accordance with fixation/separation information indicating a fixed state in which the imaging device and the information processing device are fixed to each other, or a separated state in which the imaging device and the information processing device are separated from each other, and in accordance with an operation state of the cellular phone function.

(2) The imaging system according to (1), wherein the control unit performs the state control by switching an incoming call notification method in accordance with the fixed state or the separated state indicated by the fixation/separation information at the time of reception of an incoming call in the cellular phone function.

(3) The imaging system according to (2), wherein the control unit uses the incoming call notification method that reduces effect of incoming call notification on information captured by the imaging device when the fixation/separation information indicates the fixed state.

(4) The imaging system according to (2), wherein the control unit uses the incoming call notification method that allows the imaging device to present incoming call notification when the fixation/separation information indicates the fixed state.

(5) The imaging system according to any one of (1) through (4), wherein the control unit determines whether the fixed state has been shifted to the separated state during reception of an incoming call in the cellular phone function on the basis of the fixation/separation information, and performs the state control by issuing an instruction of a start of a response to the incoming call when the fixed state has been shifted to the separated state.

(6) The imaging system according to any one of (1) through (5), wherein, in the fixed state, in an imaging mode of the imaging device, and during reception of an incoming call in the cellular phone function, the control unit performs the state control by ending the imaging mode when it is determined that the fixed state has been shifted to the separated state on the basis of the fixation/separation information.

(7) The imaging system according to (6), wherein the control unit restarts the imaging mode on the basis of an end of a response to the incoming call after an end of the imaging mode.

(8) The imaging system according to any one of (1) through (7), wherein the control unit sets a system of response to the incoming call to a speaker phone mode when the fixation/separation information indicates the separated state in an operation state of reception of an incoming call in the cellular phone function.

(9) The imaging system according to any one of (1) through. (8), wherein the control unit performs the state control by allowing the imaging device to present an incoming call responding state in the separated state indicated by the fixation/separation information, and in the incoming call responding state of the information processing device in the cellular phone function.

(10) The imaging system according to any one of (1) through (9), wherein the control unit determines a state shift from the separated state to the fixed state in an incoming call responding state in the cellular phone function on the basis of the fixation/separation information, and performs the state control by issuing an instruction of an end of a response to the incoming call on the basis of the state shift.

(11) The imaging system according to (10), wherein the control unit performs the state control by allowing the imaging device to restart the imaging mode in accordance with the instruction of the end of the response after an end of the imaging mode of the imaging device in accordance with the incoming call response.

(12) The imaging system according to any one of (1) through (11), wherein the control unit performs different state controls in accordance with selection of the fixed state or the separated state when the imaging device and the information processing device are linked with each other.

(13) The imaging system according to any one of (1) through (12), wherein the control unit performs different state controls in accordance with whether or not the information processing device is linked with the imaging device at the time of incoming call notification in the cellular phone function.

(14) The imaging system according to any one of (1) through (13), further including a fixation/separation determination unit that determines the fixed state or the separated state of the imaging device and the information processing device.

(15) The imaging system according to any one of (1) through (14), wherein the imaging device generates the image data, or the image data and audio data.

INDUSTRIAL APPLICABILITY

According to an imaging system, an imaging device, an information processing device, a method, and a program of this technology, different state controls are performed in accordance with fixation/separation information indicating a fixed state in which the imaging device and the information processing device are fixed to each other, or a separated state in which the imaging device and the information processing device are separated from each other, and in accordance with an operation state of the cellular phone function, for the imaging device or the information processing device including a cellular phone function. In this case, user-friendliness of both the cellular phone function of the information processing device, and an imaging function of the imaging device improves. Accordingly, this technology is applicable to an imaging system configured to include an imaging device not having a display function in a state of being fixed to or separated from an information processing device such as a smartphone, and allow an information processing device side check of a captured image generated by the imaging device, for example, via communication between the imaging device and the information processing device.

REFERENCE SIGNS LIST

10 Imaging system
15, 45, 85, 95 Control unit
20 Imaging device
21 Outer cylindrical unit
22 Control ring
31 Imaging optical system
32 imaging unit
33 Image processing unit
34, 75 Recording/reproducing unit
35, 78 Power supply unit
36, 76 Sensor unit
37, 77 Storage unit
38, 81 Display unit
39 Audio input unit
41, 71 Communication unit
42, 74 Illumination unit
44, 82 Operation input unit
46, 86 Recording medium
50 Attachment mechanism unit
51, 52 Attachment member
60 Information processing device
61 Outer housing
62 Display panel
72 Audio input/output unit
73 Imaging block
78 Power supply unit
83 Vibration generation mechanism
91 Fixation/separation determination unit
411, 711 First wireless communication unit
412, 712 First antenna
413, 713 Second wireless communication unit
414, 714 Second antenna
441 Zoom button
442 Shutter button
715 Third wireless communication unit
716 Third antenna

The invention claimed is:
1. An imaging system comprising:
an imaging device;
an information processing device including a cellular phone function; and
a control unit that performs, for the imaging device or the information processing device, different state controls in accordance with:
fixation/separation information corresponding to whether the imaging system is in a fixed state in which the imaging device and the information processing device are fixed to each other, or a separated state in which the imaging device and the information processing device are separated from each other, and
operation information corresponding to whether or not the cellular phone function is in use; and
wherein the control unit performs a first state control of the different state controls by providing a first incoming call notification type in a case where the fixation/separation information at a time of reception of an incoming call in the cellular phone function corresponds to the fixed state, and a second state control of the different state controls by providing a second incoming call notification type in a case where the fixation/separation information at the time of reception of the incoming call in the cellular phone function corresponds to the separated state, and wherein the second incoming call notification type is configured to reduce an effect of an incoming call notification on information captured by the imaging device in the separated state.

2. The imaging system according to claim 1, wherein the first incoming call notification type is configured to reduce an effect of an incoming call notification on information captured by the imaging device in the fixed state.

3. The imaging system according to claim 1, wherein the first incoming call notification type is configured to prohibit an incoming call notification in the fixed state.

4. The imaging system according to claim 1, wherein the control unit determines whether the fixed state has been shifted to the separated state during reception of the incoming call in the cellular phone function on the basis of the fixation/separation information, and performs a state control of the different state controls by issuing an instruction of a start of a response to the incoming call when it is determined that the fixed state has been shifted to the separated state.

5. The imaging system according to claim 1, wherein, in the fixed state, in an imaging mode of the imaging device, and during reception of the incoming call in the cellular phone function, the control unit performs a state control of the different state controls by ending the imaging mode when it is determined that the fixed state is shifted to the separated state on the basis of the fixation/separation information.

6. The imaging system according to claim 5, wherein the control unit restarts the imaging mode on the basis of an end of a response to the incoming call after an end of the imaging mode.

7. The imaging system according to claim 1, wherein the control unit sets a system of response to the incoming call to a speaker phone mode when the fixation/separation information corresponds to the separated state and the operation information corresponds to a reception of the incoming call in the cellular phone function.

8. The imaging system according to claim 1, wherein the control unit performs a state control of the different state controls by allowing the imaging device to present an incoming call responding state in the separated state indicated by the fixation/separation information, and in the incoming call responding state of the information processing device in the cellular phone function.

9. The imaging system according to claim 1, wherein the control unit determines a state shift from the separated state to the fixed state in an incoming call responding state in the cellular phone function on the basis of the fixation/separation information, and performs a state control of the different state controls by issuing an instruction of an end of a response to the incoming call on the basis of the state shift.

10. The imaging system according to claim 9, wherein the control unit performs the state control by allowing the imaging device to restart the imaging mode in accordance with the instruction of the end of the response after an end of the imaging mode of the imaging device in accordance with the incoming call response.

11. The imaging system according to claim 1, wherein the control unit performs different state controls in accordance with selection of the fixed state or the separated state when the imaging device and the information processing device are linked with each other.

12. The imaging system according to claim 1, wherein the control unit performs different state controls in accordance with whether or not the information processing device is linked with the imaging device at the time of incoming call notification in the cellular phone function.

13. The imaging system according to claim 1, further comprising
a fixation/separation determination unit that determines the fixed state or the separated state of the imaging device and the information processing device.

14. The imaging system according to claim 1, wherein the imaging device generates image data, or image data and audio data.

15. The imaging system of claim 1, wherein the cellular phone function includes communicating with one or more base stations.

16. A control method comprising:
determining fixation/separation information corresponding to whether an imaging system is in a fixed state in which an imaging device and an information processing device having a cellular phone function are fixed to each other, or a separated state in which the imaging device and the information processing device are separated from each other;
determining operation information corresponding to whether or not the cellular phone function is in use;
performing, for the imaging device or the information processing device, different state controls in accordance with the fixation/separation information and the operation information,
wherein a first state control of the different state controls is performed by providing a first incoming call notification type in a case where the fixation separation information at a time of reception of an incoming call in the cellular phone function corresponds to the fixed state,
wherein a second state control of the different state controls is performed by providing a second incoming call notification type in a case where the fixation/separation information at the time of reception of the incoming call in the cellular phone function corresponds to the separated state, and
wherein the second incoming call notification type is configured to reduce the effect of an incoming call notification on information captured by the imaging device in the separated state.

17. A non-transitory computer readable medium storing program code executable by a processing unit of a computer to cause the computer to perform control for an information processing device or an imaging device including a fixed state in which the imaging device and the information processing device including a cellular phone function are fixed to each other, and a separated state in which the imaging device and the information processing device are separated from each other, the control causing the computer to execute procedures performing, for the imaging device or the information processing device, different state controls in accordance with:
fixation/separation information corresponding to whether the imaging system is in the fixed state or the separated state, and operation information corresponding to whether or not the cellular phone function is in use, wherein a first state control of the different state controls is performed by providing a first incoming call notification type in a case where the fixation/separation information at a time of reception of an incoming call in the cellular phone function corresponds to the fixed state, wherein a second state control of the different state controls is performed by providing a second incoming call notification type in a case where the fixation/separation information at the time of reception of the incoming call in the cellular phone function corresponds to the separated state, and where the second incoming call notification type is configured to reduce an effect of an incoming call notification on information captured by the imaging device in the separated state.

18. An imaging device that includes a fixed state of being fixed to an information processing device including a cellular phone function, and a separated state of being separated from the information processing device, the imaging device comprising a control unit that performs different state controls in accordance with:

fixation/separation information corresponding to whether the imaging device is in the fixed state or the separated state, and operation information corresponding to use of the cellular phone function of the information processing device, wherein the control unit performs a first state control of the different state controls by providing a first incoming call notification type in a case where the fixation/separation information at a time of reception of an incoming call in the cellular phone function corresponds to the fixed state, and a second state control of the different state controls by providing a second incoming call notification type in a case where the fixation/separation information at the time of reception of the incoming call in the cellular phone function corresponds to the separated state, and wherein the second incoming call notification type is configured to reduce an effect of an incoming call notification on information captured by the imaging device in the separated state.

19. An information processing device that includes a fixed state of being fixed to an imaging device, and a separated state of being separated from the imaging device, the information processing device comprising:

a cellular phone function unit; and a control unit that executes, for the imaging device, different state controls in accordance with:

fixation/separation information corresponding to whether the information processing device is in the fixed state or the separated state, and operation information corresponding to use of the cellular phone function unit, wherein the control unit performs a first state control of the different state controls by providing a first incoming call notification type in a case where the fixation/separation information at a time of reception of an incoming call in the cellular phone function corresponds to the fixed state, and a second state control of the different state controls by providing a second incoming call notification type in a case where the fixation/separation information at the time of reception of the incoming call in the cellular phone function corresponds to the separated state, and wherein the second incoming call notification type is configured to reduce an effect of an incoming call notification on information captured by the imaging device in the separated state.

* * * * *